US006314434B1

(12) United States Patent
Shigemi et al.

(10) Patent No.: US 6,314,434 B1
(45) Date of Patent: Nov. 6, 2001

(54) STRUCTURED DATA MANAGEMENT SYSTEM AND COMPUTER-READABLE METHOD FOR STORING STRUCTURED DATA MANAGEMENT PROGRAM

(75) Inventors: Nobuhisa Shigemi; Hiroyuki Yamamoto; Gengo Tazaki; Makoto Yoshioka; Mitsuhiro Kokubun, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/168,221

(22) Filed: Oct. 8, 1998

(30) Foreign Application Priority Data

Apr. 15, 1998 (JP) .................................................. 10-104266

(51) Int. Cl.$^7$ .................................................... G06F 12/00
(52) U.S. Cl. ............................................ 707/203; 707/204
(58) Field of Search ..................... 707/200, 103, 707/101, 102, 104, 522, 515, 517, 203, 204; 700/2; 709/215, 221; 395/500.44

(56) References Cited

U.S. PATENT DOCUMENTS

| | | | | |
|---|---|---|---|---|
| 4,987,536 | * | 1/1991 | Humblet | 364/200 |
| 5,226,163 | * | 7/1993 | Karsh et al. | 707/200 |
| 5,430,869 | * | 7/1995 | Ishak et al. | 707/101 |
| 5,553,216 | * | 9/1996 | Yoshioka et al. | 707/515 |
| 5,671,398 | * | 9/1997 | Neubauer | 395/500.44 |
| 5,706,431 | * | 1/1998 | Otto | 709/221 |
| 5,805,889 | * | 9/1998 | Vanter | 395/703 |
| 5,819,280 | * | 10/1998 | Nagai | 707/103 |
| 5,877,766 | * | 3/1999 | Bates et al. | 345/357 |
| 5,897,636 | * | 4/1999 | Kaeser | 707/100 |
| 5,903,902 | * | 5/1999 | Orr et al. | 707/517 |
| 5,909,688 | * | 6/1999 | Yoshioka et al. | 707/200 |
| 5,915,259 | * | 6/1999 | Murata | 707/513 |
| 6,023,691 | * | 2/2000 | Bertrand et al. | 706/2 |
| 6,108,676 | * | 8/2000 | Nakatsuyama | 707/522 |
| 6,145,119 | * | 11/2000 | House et al. | 717/1 |
| 6,158,044 | * | 12/2000 | Tibbetts | 717/1 |
| 6,182,121 | * | 1/2001 | Wlaschin | 709/215 |
| 6,226,675 | * | 5/2001 | Meltzer et al. | 709/223 |

FOREIGN PATENT DOCUMENTS

| | | | | |
|---|---|---|---|---|
| 11-296541 | * | 10/1999 | (JP) | 15/40 |
| 11-296544 | * | 10/1999 | (JP) | 15/419 |

OTHER PUBLICATIONS

Dattolo et al., "Analytical Version Control Management in a Hypertext System," ACM 1994, pp. 132–139.*

* cited by examiner

*Primary Examiner*—Thomas Black
*Assistant Examiner*—Charles L. Rones
(74) *Attorney, Agent, or Firm*—Staas & Halsey LLP

(57) ABSTRACT

A structured data management system which provides services concerning a structured electronic data object. In this system, a structured data storage unit stores a plurality of structured data objects associated with each other. Each structured data object can be represented as a tree structure constructed by a plurality of data elements, or nodes. Further, the individual nodes of a tree structure are associated with their respective process scripts. Through an input/output interface unit, a message addressed to a certain destination node arrives. Upon receipt of the message, a structured data processing unit identifies the destination node by tracing the tree structure of a particular structured data object where the destination node resides. The structured data processing unit then executes a process script associated with the destination node being identified. During the execution of this process script, the structured data processing unit may encounter another message that is addressed to a node in a different structured data object. In this case, the structured data processing unit reads out the specified object from the structured data storage unit and executes a process script of that node.

8 Claims, 29 Drawing Sheets

```
〖BUSINESS PROCESS: STRUCTURE DEFINITION〗
<!-- Name: idef0 DTD [idef0.dtd] -->
<!DOCTYPE  BUSINESS_PROCESS [
<!ELEMENT  BUSINESS_PROCESS - - (ACTIVITY+)>
<!ATTLIST  BUSINESS_PROCESS  NAME   NAME #REQUIRED>
<!ELEMENT  ACTIVITY - - ((OUTPUT, INPUT, CONTROL,
                         RESOURCES) | ACTIVITY*)>
<!ATTLIST  ACTIVITY   NAME   NAME #REQUIRED>
<!ELEMENT  OUTPUT - - (OUTPUT NAME+)>
<!ELEMENT  OUTPUT_NAME - - EMPTY>
<!ATTLIST  OUTPUT_NAME   NAME   NAME #REQUIRED>
<!ELEMENT  INPUT - - (INPUT NAME+)>
<!ELEMENT  INPUT_NAME - - EMPTY>
<!ATTLIS   INPUT_NAME   NAME   NAME #REQUIRED>
<!ELEMENT  CONTROL - - (CONTROL NAME+)>
<!ELEMENT  CONTROL_NAME - - EMPTY>
<!ATTLIST  CONTROL_NAME   NAME   NAME #REQUIRED>
<!ELEMENT  RESOURCE - - (RESOURCE NAME+)>
<!ELEMENT  RESOURCE_NAME - - EMPTY>
<!ATTLIST  RESOURCE_NAME   NAME   NAME #REQUIRED>
]>
```

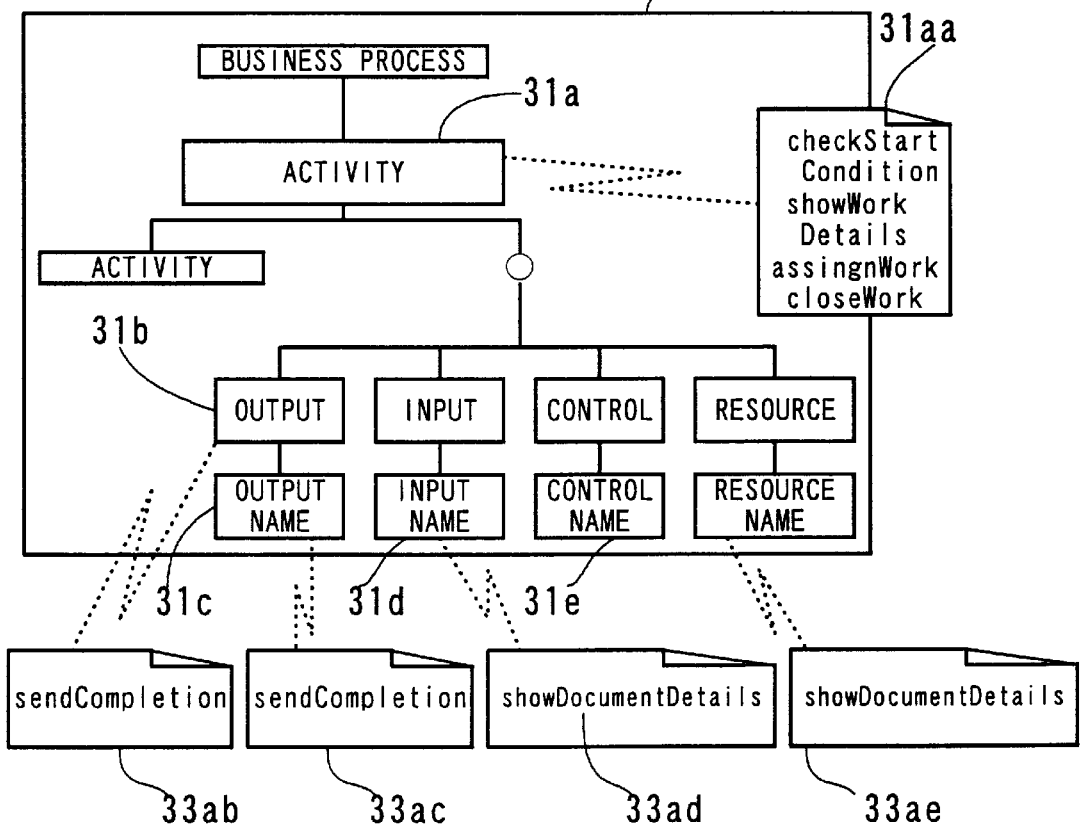

```
【BUSINESS PROCESS: PROCESS SCRIPT】

%------------------------------------------
/closeWork
%[INPUT] TAG ID [OUTPUT] (NONE)
%[FUNCTION] SEND A "SEND COMPLETION" MESSAGE
            TO THE OUTPUT UNDER THE PRESENT TAG
%------------------------------------------
{
  %THE PRESENT TAG LOCATION
  /workingTag exch def
  workingTag ".OUTPUT" childTag
  "SEND COMPLETION" sendMessage
}def
...
```

```
【BUSINESS PROCESS: RELATIONSHIP DESCRIPTION】
%[ELEMENT NAME      MESSAGE NAME       OPERATOR]
%------------------------------------------------------------
["ACTIVITY"     "CHECK START CONDITION"  {checkStartCondition}]
["ACTIVITY"     "SHOW WORK DETAILS"      {showWorkDetails}]
["ACTIVITY"     "ASSIGN WORK"            {assignWork}]
["ACTIVITY"     "CLOSE WORK"             {closeWork}]
["OUTPUT"       "SEND COMPLETION"        {sendCompletion}]
["INPUT_NAME"   "ACCEPT COMPLETION"      {acceptCompletion}]
["INPUT_NAME"   "SHOW DOCUMENT DETAILS"  {showDocumentDetails}]
["CONTROL_NAME" "SHOW DOCUMENT DETAILS"  {showDocumentDetails}]
["OUTPUT_NAME"  "CREATE DOCUMENT"        {createDocument}]
...
```

```
[BUSINESS PROCESS: INSTANCE OF DESIGN MANAGEMENT]
<!DOCTYPE PROJECT SYSTEM "idef0.dtd">
<BUSINESS_PROCESS NAME = "DESIGN MANAGEMENT">
 <ACTIVITY NAME = "DRAWING QUALITY CONTROL">
  <ACTIVITY NAME = "DESIGN CHECK">
     <OUTPUT><OUTPUT_NAME NAME = "DESIGN CHECK RESULT"></OUTPUT>
     <INPUT><INPUT_NAME NAME = "DRAWINGS"></INPUT>
     <CONTROL><CONTROL_NAME NAME = "QUALITY STANDARD"></CONTROL>
     <RESOURCE><RESOURCE_NAME NAME = "DESIGN ADMINISTRATION DEPARTMENT>
  </ACTIVITY>  </RESOURCE>
  <ACTIVITY NAME = "DESIGN RULE CHECK">
     <OUTPUT><OUTPUT_NAME NAME = "DESIGN RULE">
       <OUTPUT_NAME NAME = "FINAL DRAWINGS"></OUTPUT>
     <INPUT><INPUT_NAME NAME = "DESIGN CHECK RESULT"></INPUT>
     <CONTROL><CONTROL_NAME NAME = "QUALITY STANDARD">
       <CONTROL_NAME NAME = "PRODUCT COST STANDARD"></CONTROL>
     <RESOURCE><RESOURCE_NAME NAME = "QUALITY ASSURANCE SECTION">
  </ACTIVITY>  </RESOURCE>
 </ACTIVITY>
 <ACTIVITY NAME = "WORK COST MANAGEMENT">
  <ACTIVIT NAME = "DEVELOPMENT OF DESIGN RULES AND STANDARDS">
     <OUTPUT><OUTPUT_NAME NAME = "DESIGN STANDARD">
       <OUTPUT_NAME NAME = "VARIOUS STANDARDS AND RULES"></OUTPUT>
     <INPUT><INPUT_NAME NAME = "FINAL DRAWINGS"></INPUT>
     <CONTROL><CONTROL_NAME NAME = "QUALITY STANDARD"></CONTROL>
     <RESOURCE><RESOURCE_NAME NAME = "DESIGN ADMINISTRATION
        DEPARTMENT"></RESOURCE>
  </ACTIVITY>
  <ACTIVITY NAME = "STANDARDIZATION OF WORKFLOW">
     <OUTPUT><OUTPUT_NAME NAME = "DESIGN STANDARD">
       <OUTPUT_NAME NAME = "STANDARD MAN-HOUR LIST"></OUTPUT>
     <INPUT><INPUT_NAME NAME = ""></INPUT>
     <CONTROL><CONTROL_NAME NAME = "QUALITY STANDARD">
       <CONTROL_NAME NAME = "VARIOUS STANDARDS AND RULES"></CONTROL>
     <RESOURCE><RESOURCE_NAME NAME = "DESIGN ADMINISTRATION
        DEPARTMENT"></RESOURCE>
  </ACTIVITY>
 </ACTIVITY>
 <ACTIVITY NAME = "WORK SCHEDULE MANAGEMENT">
     <OUTPUT><OUTPUT_NAME NAME = "DESIGN PLANNING"></OUTPUT>
     <INPUT><INPUT_NAME NAME = "STANDARD MAN-HOUR LIST">
       <INPUT_NAME NAME = "PROGRESS STATUS"></INPUT>
     <CONTROL><CONTROL_NAME NAME = "PRODUCTION START DATE"></CONTROL>
     <RESOURCE><RESOURCE_NAME NAME = "DESIGN ADMINISTRATION
        DEPARTMENT"></RESOURCE>
 </ACTIVITY>
</BUSINESS_PROCESS>
```

32a  ⇩ OUTLINE  32a

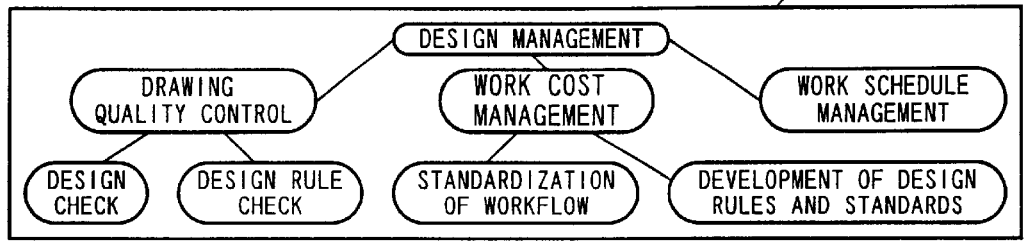

```
[ORGANIZATION: PROCESS SCRIPT]

%------------------------------
/sendWork
%[INPUT] MESSAGE CONTENTS,TAG ID [OUTPUT](NONE)
%[FUNCTION] RECEIVED MESSAGE IS FORWARDED TO THE
           HEAD OF ORGANIZATIONAL UNIT BY E-MAIL
%------------------------------
{
  %THE PRESENT TAG LOCATION
  /organizationTag exch def
  %THE MESSAGE CONTENTS
  /receivedMessageContents exch def organizationTag
           ".HEAD.ADDRESS" childTag  getElementText
  /emailAddress exch def
  receivedMessageContents emailAddress sendMail
}def
...
```

```
[ORGANIZATION: RELATIONSHIP DESCRIPTION]
%[ELEMENT NAME    MESSAGE NAME    OPERATOR]
%----------------------------------------------
["DEPARTMENT"    "SEND WORK"    {sendWork}]
["SECTION"       "SEND WORK"    {sendWork}]
...
```

```
[ORGANIZATION: DESIGN OFFICE INSTANCE]
<!DOCTYPE PROJECT SYSTEM "Organization.dtd">
<ORGANIZATION NAME = "FUJI DESIGN OFFICE">
  <DEPARTMENT NAME = "DESIGN ADMINISTRATION DEPARTMENT">
    <HEAD NAME = "YAMADA">
      <ADDRESS>yamada@fuji.jpn</ADDRESS>
      <MAIL_SERVER>mail.fuji.jpn</MAIL_SERVER>
      <ACCOUNT>yamada</ACCOUNT>
      <PASSWORD>****</PASSWORD></HEAD>
    <SECTION NAME = "FIRST ADMINISTRATION SECTION">
      <HEAD NAME = "TANAKA">
        <ADDRESS>tanaka@fuji.jpn</ADDRESS>
        <MAIL_SERVER>mail.fuji.jpn</MAIL_SERVER>
        <ACCOUNT>tanaka</ACCOUNT>
        <PASSWORD>****</PASSWORD></HEAD>
    </SECTION>
    <SECTION NAME = "SECOND ADMINISTRATION SECTION">
      <HEAD NAME = "NAKATA">
        <ADDRESS>nakata@fuji.jpn</ADDRESS>
        <MAIL_SERVER>mail.fuji.jpn</MAIL_SERVER>
        <ACCOUNT>nakata</ACCOUNT>
        <PASSWORD>****<PASSWORD></HEAD>
    </SECTION>
      <SECTION NAME = "QUALITY ASSURANCE SECTION">
        <HEAD NAME = "SUZUKI">
          <ADDRESS>suzuki@fuji.jpn</ADDRESS>
          <MAIL_SERVER>mail.fuji.jpn</MAIL_SERVER>
          <ACCOUNT>suzuki</ACCOUNT>
          <PASSWORD>****<PASSWORD></HEAD>
      </SECTION>
  </DEPARTMENT>
</ORGANIZATION>
```

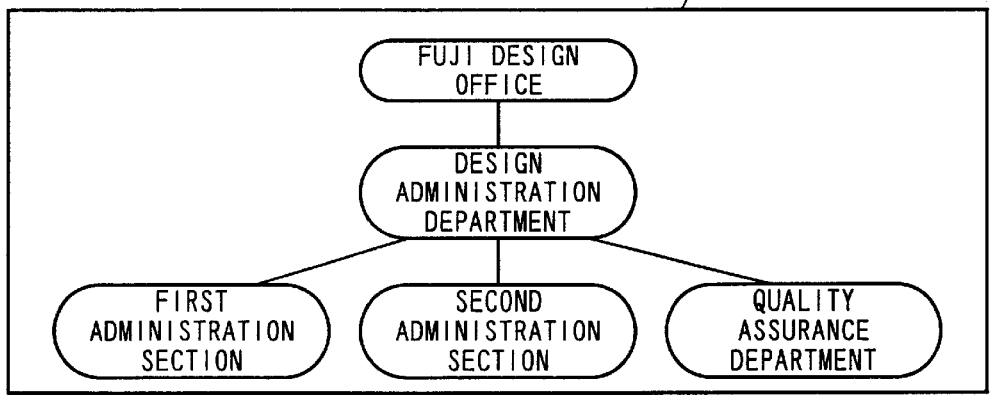

FIG. 14

STRUCTURED DATA MANAGEMENT SYSTEM AND COMPUTER-READABLE METHOD FOR STORING STRUCTURED DATA MANAGEMENT PROGRAM

BACKGROUND OF THE INVENTION

1. Field of the Invention

The present invention relates to a structured data management system which processes structured electronic data, and to a computer-readable storage medium which stores a structured data management program which causes a computer to process structured electronic data. More particularly, the present invention relates to a structured data management system which supports such a processing environment where a plurality of structured data objects are associated with each other. Further, the present invention relates to a computer-readable medium which stores a structured data management program designed to make a computer perform the same.

2. Description of the Related Art

Conventionally, the efforts to develop information systems to aid various business activities in an enterprise have been directed toward the support of routine works that do not change very much with time. In reality, however, there is no business that can sustain without changes, and the user needs to constantly grow in sophistication. System development usually starts with the analysis and modeling of current business processes, and time-consuming development work follows them. This conventional way of system development, however, would sometimes result in a big disappointment of users because their requirements vary with time. The system becomes out-of-date soon after its deployment, or the obsolescence begins even at the moment when its development is started.

Additionally, the basic design of conventional business support systems do not allow for possible changes in the real-life business operations. Therefore, the data storage structure and behavioral definitions of data objects (i.e., definitions of how to process given data objects) are integrated in the applications as part of their system functions. Such conventional business support systems have difficulty in adapting themselves to new user requirements that stem from ever-changing business environments. As a result, conventional systems often require the conversion of a large amount of corporate information assets into a new data structure.

To solve the above problems, new integrated software suites called the "Enterprise Resource Planning" (ERP) packages have been developed. This type of software package offers various business process models in the form of software components having parameterized behavior models. This makes it possible to develop a desired system by simply combining software components and setting their parameters in accordance with the user's business environment.

The above integrated software packages, however, require all business processes to be analyzed and set up at a very early stage of development, and therefore, the system engineers must have deep knowledge about both ERP tools and real-world business activities. This leads to another problem that it takes much time to start up the system. In order to keep up with ever-changing business operations and continuously provide effective support to the user, it is necessary to dynamically change, expand, and/or consolidate the system in the course of operations, by combining the best-suited technologies in a timely manner. Unfortunately, the existing ERP packages are lacking in this capability.

No matter how versatile the software components are, actual business activities have a unique personality all their own. A business support system constructed with such components would require the users to adapt themselves to the system. This situation, however, seems to get things the wrong way around.

Furthermore, data models offered by system vendors are not flexible. Their fundamental features are fixed, and user-definable part is limited. Additionally, it is hard to know the relationships between data items and process definitions. As a matter of fact, it is impossible for the users to alter the predefined data structures.

Meanwhile, there are business support packages called "workflow," which permits each work to be modeled in accordance with the user's intention. These types of packages, however, have the same deficiencies as existing ERP packages have. That is, everything should be defined at an initial stage; once they are deployed, it is impossible to change them, or complex procedures are required to do it. In addition, the scope of workflow packages is limited to a small area of business activities, and it is not a practical approach to apply them to an entire business operation.

Another problem with the ERP and workflow packages is the difficulty in customizing their standard definitions of business processes or organizational structures. One reason for this is that the definitions are formulated through a graphical user interface (GUI) and their internal representation is hidden from the user. Therefore, it is hard for the user to add a new data structure, or to define links to other systems.

In summary, conventional tools are not suitable for the development and operations of a business support system for non-routine tasks that often change over time. Therefore, it is necessary to introduce manual operations to process non-automated tasks. In addition, the user has to enter the same data over and over, since conventional system tools are unable to effectively reuse the legacy information.

SUMMARY OF THE INVENTION

Taking the above into consideration, an object of the present invention is to provide a structured data management system which processes structured data objects while adaptively dealing with their changes.

Another object of the present invention is to provide a computer-readable medium for storing a structured data management program, which permits a computer to process structured data objects, as well as flexibly dealing with changes in the structured data objects being concerned.

To accomplish the above objects, according to the present invention, there is provided a structured data management system for providing services concerning structured electronic data objects. This system comprises a structured data storage unit and a structured data processing unit. The structured data storage unit stores structured data objects, each of which is expressed as a tree structure having a plurality of nodes. Each node represents a unit of data to be processed and is associated with a process script that defines what process should be executed. The structured data processing unit identifies a destination node in one of the structured data objects stored in the structured data storage unit by tracing the tree structure of the one of the structured data objects according to a process request addressed to the destination node. It then executes the process script associated with the destination node according to the process request, and sends another process request to another node if required in the execution of the process script.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 9 is a diagram which shows a detailed structure definition of a business process model;

FIG. 10(A) is a diagram which shows an operator associated with an "Activity" node;

FIG. 10(B) is a diagram which shows a relationship description corresponding to the structure definition;

FIG. 11 is a diagram which shows an instance of the business process model;

FIG. 13(A) is a diagram which shows the definition of an operator being associated with both "Department" and "Section" nodes in the organization model;

FIG. 13(B) is a diagram which shows a relationship description corresponding to the structure definition of the organization model;

FIG. 14 is a diagram which shows an example of an organization model instance;

DESCRIPTION OF THE PREFERRED EMBODIMENTS

An embodiment of the present invention will be described below with reference to the accompanying drawings.

Figure 1:
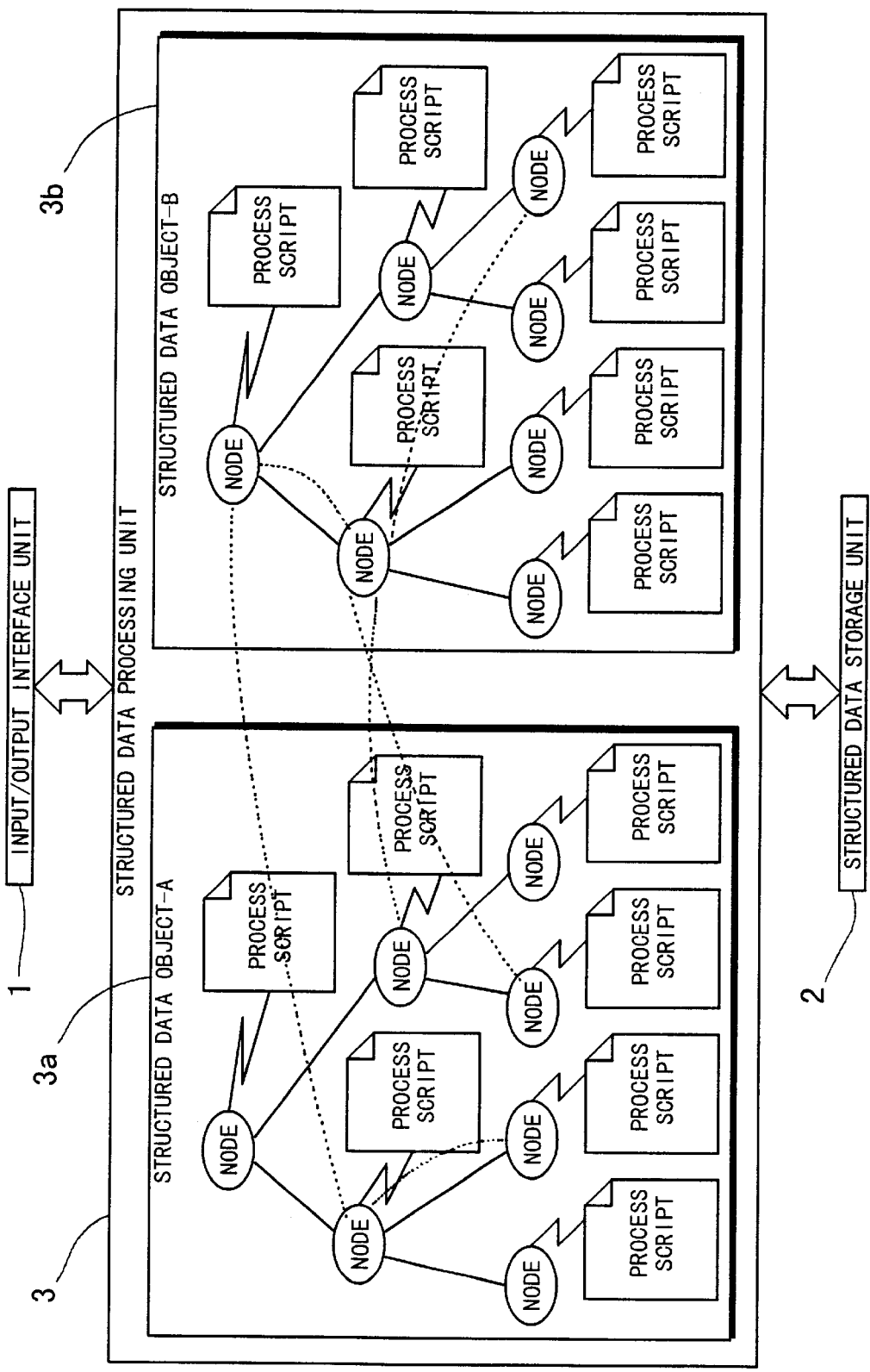
FIG. 1 is a conceptual view of the present invention.

FIG. 1 is a conceptual view of a structured data management system according to the present invention. This system comprises three main elements: an input/output interface unit 1, a structured data storage unit 2, and a structured data processing unit 3. The input/output interface unit 1 controls data transfer operations to/from the user or other systems. The structured data storage unit 2 holds a plurality of structured data objects associated with each other. Each structured data object can be represented as a tree structure having a plurality of data elements, or nodes. Further, the individual nodes of a tree structure are associated with their corresponding processes, which are defined in the form of process scripts. The process scripts, being written in a computer-executable language, may include a statement that requests another node to execute some specific process. In this description, such a process request to another node is called a "message." Since the system may encounter a power failure during its operation, the structured data storage unit 2 uses a non-volatile storage medium, such as magnetic storage devices, to maintain the data integrity even in such a problem situation.

Upon receipt of a message from the input/output interface unit 1, the structured data processing unit 3 retrieves from the structured data storage unit 2 a particular structured data object 3a specified in the received message. The structured data processing unit 3 analyzes the tree structure of this structured data object 3a to identify a node to be processed, and then executes a specific process script associated with the identified node. When the process script includes a message to another node, the structured data processing unit 3 executes another process script relevant to that node, while parsing the message. If the message specifies still another node that resides in a different structure data set 3b, for example, the structured data processing unit 3 reads out the specified structured data object 3b from the structured data storage unit 2 and executes a process script related to the destination node. When it is unable to find the specified destination of the message, the structured data processing unit 3 would attempt to trace the tree structure to identify an alternative node that should receive the message, and execute a process script associated to the node.

In the above-described arrangement, each individual node is allowed to have a script to define its own local process, and pass the result or parameters to another node within the same data object or in another data object by tracing the tree structure of objects. While the structure varies over time, the system can identify the nodes in a consistent manner, as long as the scope of variation is limited to the locations of nodes.

There are, however, other kinds of modifications, such as separation, consolidation, addition, and deletion of nodes. Even if such a modification occurs, it is still possible to investigate to which node the process should be linked, by comparing upper-level nodes of the new structure with those of the old structure, automatically by the system or semi-automatically with the intervention of a user. Because every structured data object has at least its root node, the system can continue the execution of a process without interruption, when a link related to the process has been lost.

For example, there is a structured data object named "Organization," which describes an enterprise's organizational structure. This organization model should be updated to a new version, each time a change occurs in the enterprise's organization. Suppose here that one member node of the old structured data object has become obsolete as a result of changes in the organization. In this case, messages addressed to the obsolete node can still be handled in the new organization model. That is, even if the node itself cannot be found in the new version, the structured data processing unit 3 will investigate the upper-level structure of the obsolete node in the old version, identify its parent node (or grandparent node, or the like) in the new version, and redirect the messages to that node.

The above approach, however, may not always work well, depending on the types and properties of structured data objects. Take other objects such as "Documentation System" and "Bill of Material" for example. In the case of this kind of structured data object, any attempt to redirect the messages to upper-level nodes would end up with unsuccessful results. When the specified destination node is found obsolete in a new structured data object of this kind, the structured data processing unit 3 locates relevant nodes in both old and new objects, and presents them to the user. This feature allows the user to specify or select which node should handle the messages, thus making it possible to continue the process.

There is still another group of structured data objects, to which the above automatic or manual message redirection cannot apply. A structured data object named "Items of Expense" is a typical object of this kind. To cope with such objects, the structured data processing unit 3 can optionally be configured to notify the system administrator of the contents of a message, when the destination of the message no longer exists.

As explained above, each structured electronic data object is associated with relevant process scripts that describe how the individual nodes will behave. Therefore, in the present invention, the user can easily change the process behavior (i.e., the content of processes), or locate a specific node or link that is causing a problem. If two or more instances of structured electronic data can be processed in an associated manner, the system will be a strong tool that totally supports a variety of business activities in the enterprise by linking many objects that express their structure and behavior.

Figure 2:
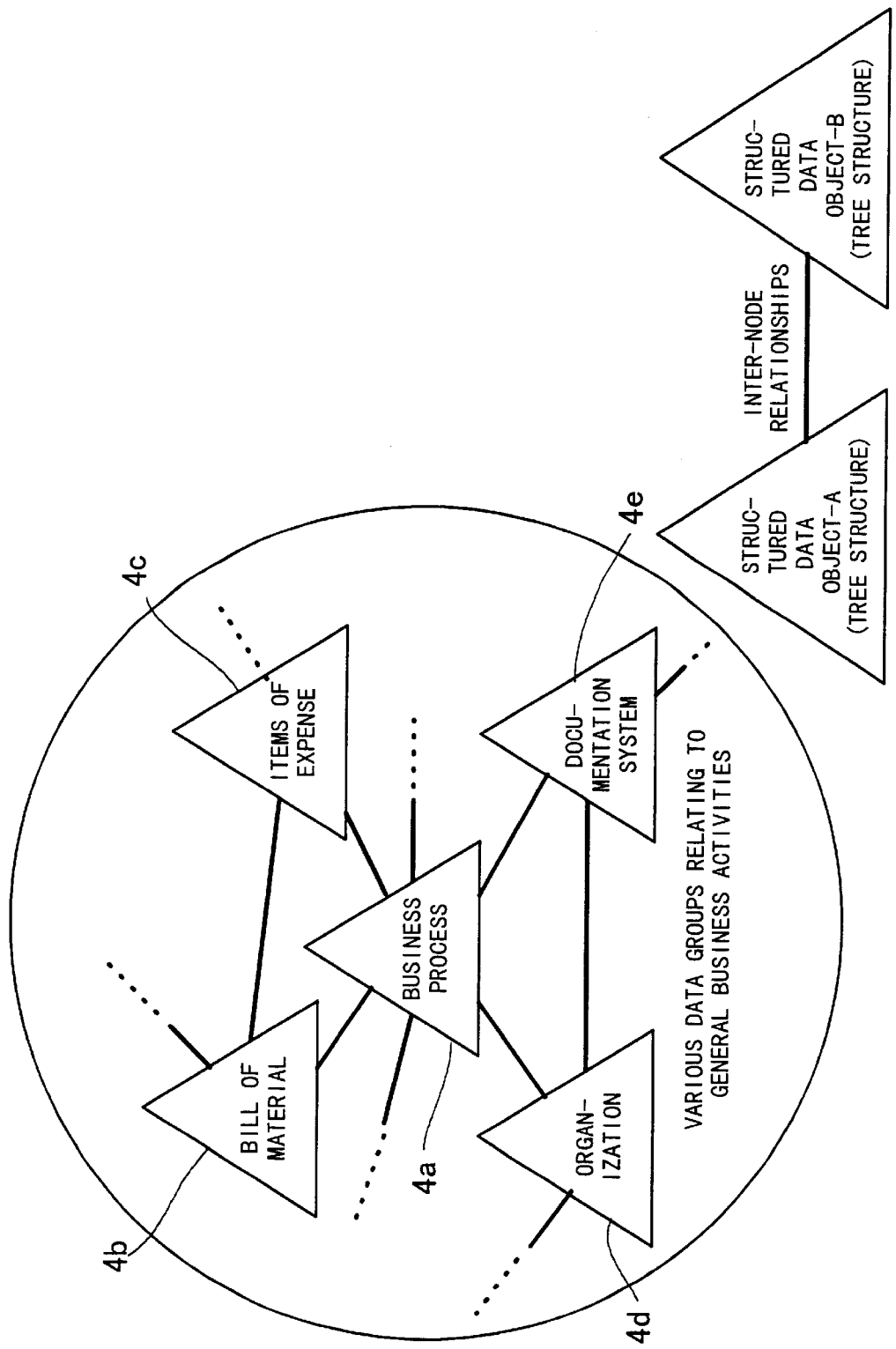
FIG. 2 is a diagram which schematically shows the relationships among a plurality of data groups representing various business activities in an enterprise.

FIG. 2 schematically shows the relationships among a plurality of data objects that may appear in an enterprise's business activities, where each single triangle represents a data object having a tree structure. This specific example of FIG. 2 includes five structured data objects named "Business Process" (*4a*), "Bill of Material" (*4b*), "Items of Expense" (*4c*), "Organization" (*4d*), and "Documentation system" (*4e*). The links interconnecting these structured data objects *4a* to *4e* denote inter-node relationships.

By defining each individual inter-node relationship in this way, the business activities and services can be rendered as the relationships among many structured data objects. This results in a large network of structured data objects, which encompasses various aspects of concurrent business activities in a flexible manner, while involving a plurality of organizational units in the enterprise. Accordingly, the proposed system will be able to support the entire set of activities in the enterprise.

Further, the business support system of the present invention copes with frequent changes in the data structure that may happen during its operations. This is accomplished by storing both old and new versions of structured data objects and defining appropriate relationships between them.

Figure 3:
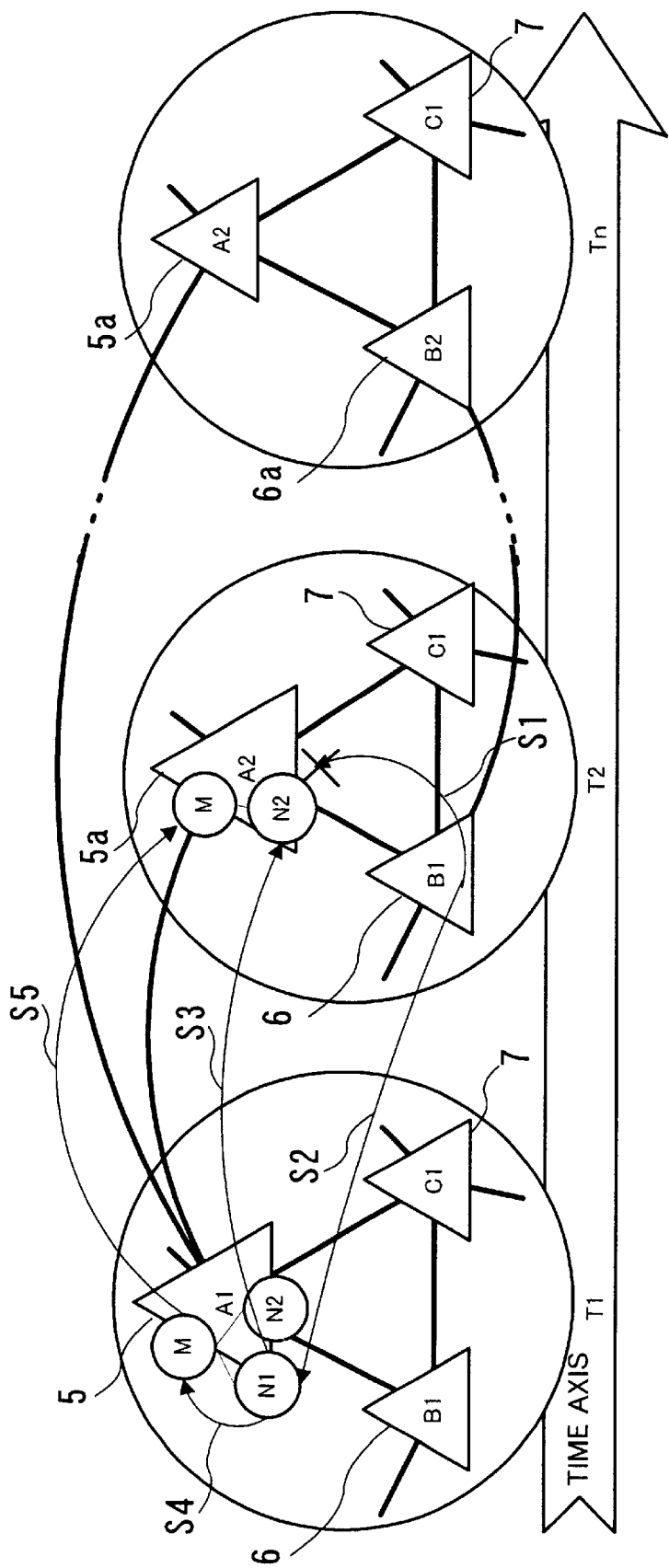
FIG. 3 is a diagram which shows how to manage a change in a structured data object.

FIG. 3 explains how to manage the structured data objects that vary over time, by illustrating three snapshots of a data model at times T1, T2, and Tn. In this specific example, three structured data objects 5 to 7 exist at time T1, being associated with each other. They are named "A1", "B1," and "C1," respectively. The structured data object "A1" 5 has its own internal structure, in which a node M is placed as a parent of two other nodes N1 and N2. There is a reference link from the structured data object "B1" 6 to the node N1 in the structured data object "A1" 5.

Suppose here that the node N1 is deleted at time T2, and the structured data object "A1" 5 is now revised to a new structured data object 5*a* with the name "A2," as shown in the central part of FIG. 3. In this object 5*a*, only one node N2 remains under the top node M. Consider that a process script in the structured data object "B1" 6 is executed at time T2, and an access request to the obsolete node N1 of the old structured data object 5 is issued. In this situation, the system can manage the change to continue the present process script execution, as long as the relationship between the old version "A1" 5 and the new version "A2" 5*a* is known.

In general, the relationships between old and new versions of a structured data object can be classified into two types. The first type of relationships are called "implicit relationships," which denote only a simple fact that one is new and the other is old, but provide no further details. The second type of relationships are called "explicit relationships," which definitely describe how the nodes in the old structure are associated with their counterparts in the new structure. According to such relationships, the following steps will be executed.

First, a node in the structured data object "B1" attempts to make access to the node N1, expecting that it is in the structured data object "A2" (Step S1). The structured data object processing unit 3 (FIG. 1), however, recognizes that the specified destination node N1 is not present in the target object. It then refers to the old version "A1" (Step S2) and judges whether the relationship between "A1" and "A2" is explicit or implicit.

If the two versions have an explicit relationship, the structured data processing unit 3 continues the process according to the inter-node relationships being defined explicitly. Suppose, for example, that the new definition recites that the revised object A2 does not have a node corresponding to the node N1. The structured data processing unit 3 then prompts the user to enter an appropriate instruction, while showing him/her the current situation of both structured data objects A1 and A2. Consider another situation where the new definition suggests that the node N2 in the object A2 inherits the function of the old node N1. In this situation, the structured data processing unit 3 automatically continues the process by using the node N2 instead of N1 (Step S3).

If the relationship between A1 and A2 is implicit, the structured data processing unit 3 searches the original structured data object A1 to find a parent node of the node N1 (Step S4). The node M is what it is seeking in the current context of FIG. 3. Next, the structured data processing unit 3 tries to find this node M in the new structured data object A2. Since the node M is successfully found, the structured data processing unit 3 continues the process by using the node M instead of N1 (Step S5). At this step, the user will be notified by the system about how the process is reorganized. More specifically, the user is offered an opportunity to change the decision made by the system by specifying his/her preferable node. Now that the new destination is determined in this way, the process scripts in the structured data object B1 are updated so that their references to the obsolete node N1 will point to the new destination. This modification yields a new structured data object 6a with the name "B2."

As described above, the system of the present invention is designed to preserve the old version of a structured data object when it is changed. This makes it possible for the system to continue the execution of a process by tracing explicit relationships between old and new structured data objects or comparing the structures of the two versions with each other. That is, a partial change in a structured data object does not interrupt the process execution, but will be automatically solved by a flexible mechanism. Although the above section has illustrated such a situation where one node is deleted, the present invention is not limited to this specific situation, but can be applied to other cases, including the division or consolidation of nodes.

Recall that the structured data processing unit 3 is designed to search for the parent of a lost destination node, when only an implicit relationship is given. This search, however, would end up with no good results if the parent node has been deleted together with its child node. In this case, the structured data processing unit 3 attempt to find its grandparent node, and if this search fails again, it then goes up to the next level of the tree structure. It should be noted here that the structured data processing unit 3 will finally find an alternative destination node, because the new and old structured data objects must share the root node by definition. This is why the system never stops the process execution, coping with any changes that have been made on the nodes.

In other words, this mechanism of the structured data processing unit 3 is analogous to how humans deal with an unexpected change by using their logical processing capabilities. Suppose, for example, that one staff has a problem and calls another section to talk to a person who would give him/her a good solution. But if that person (i.e., the destination node) cannot be reached, he/she will then bring the request to the chief of the section (i.e., the parent node of the lost destination). Consider another situation where an experienced person is stuck at a certain business process change that is new to him/her. In such a case, the person would try to continue the process, following the analogy of the old process that he/she is familiar with. This kind of human flexibility is implemented in the structured data processing unit 3 of the present invention.

Further, in the present invention, the structured data objects and their definitions, as well as process scripts associated with them, are maintained separately from the main system functions provided by the structured data processing unit 3. This arrangement permits the users to alter their system at any time, in a flexible manner. More specifically, the users can perform the maintenance of their system without stopping it. Or, in order to keep competitive in the ever-changing business environments, the users can alter the behavior of their business support system by modifying a process script associated with each node. This also enables incremental system development, from a simple tool to help a small work to an enterprise-wide integrated business support system. Since each data object is represented by a hierarchical tree structure, an incremental modeling approach can be applied to the system development. That is, the development starts with a broad definition of its fundamental tree structure, and additional support functions will then be gradually implemented by dividing a node into a plurality of low-level nodes.

Moreover, in the present invention, the nodes in a structured data object are associated with specific process scripts that describe how the individual nodes should work. That is, the system's behavior is defined by scripting a local process required in each individual node. This feature is advantageous because the user can easily change the process behavior. Also, in a problem situation, the user can locate a specific node or link that is causing the problem.

Now, the following section will describe the details of the present embodiment by illustrating a typical business support system as an application of the structured data management system of the present invention.

Figure 4:
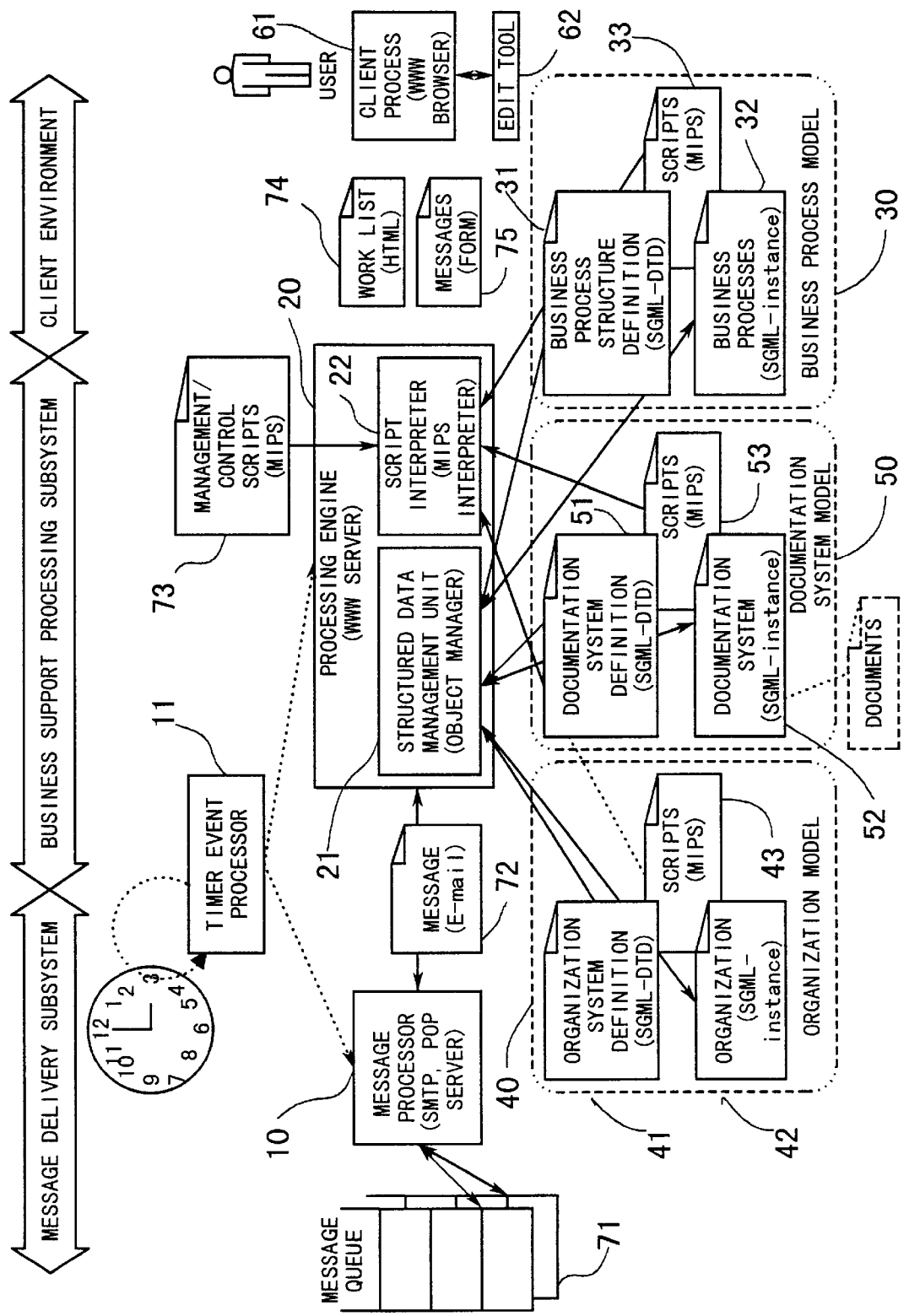
FIG. 4 is a block diagram of a business support system.

FIG. 4 is a block diagram of a business support system according to the present invention. This system consists of three parts: a message delivery subsystem, a business support processing subsystem, and a client environment. The message delivery subsystem comprises a message processor 10 and a timer event processor 11. The business support processing subsystem includes a processing engine 20, a structured data management unit 21, and a script interpreter 22. The client environment involves a client process 61 and various software tools such as an edit tool 62.

To make this system work as intended, several kinds of scripts should be written. They include:

scripts to define a business process model 30, scripts to define an organization model 40, scripts to define a documentation system model 50, and a management/control script 73 to define how to operate the processing engine 20.

These scripts are stored in a hard disk or other storage media, and executed by the processing engine 20 after being loaded onto its main storage (semiconductor memory).

The business process model 30, organization model 40, and documentation system model 50 are called "management objects." Actually, this term "management object" refers to what has been discussed as a structured data object and its corresponding process scripts in the conceptual view of FIG. 1. While the concepts represented by the management objects 30, 40, and 50 are different from each other, their data structure is defined in a unified style, containing the following elements:

document type definitions 31, 41, and 51 that define the basic structure of data objects, instances 32, 42, and 52 created in accordance with the document type definitions, and scripts 33, 43, and 53 that define specific processes associated with the elements in each document type definition or the nodes in each structured data object.

More specifically, the data type definitions 31, 41, and 51 and instances 32, 42, and 52 are written in the Standard Generalized Markup Language (SGML), an international standard for structured electronic documents. On the other hand, the process scripts are written in the Micro Post Script (MIPS), a scripting language whose syntax rules accept natural expressions in Japanese. It should be noted, however, that the MIPS scripts in the accompanying drawings are translated into English, although their original version is written in Japanese.

As such, two different language specifications, SGML and MIPS, are used the present invention. This is because they are helpful in clearly separating data from processes. SGML is a suitable foundation for document processing, which enables the user to easily describe the desired system structure by using flexible data modeling rules called "Document Type Definition" (DTD). Since the proposed system is designed to handle various business documents as one of the structured data objects shown in FIG. 1, SGML-based (i.e., structured) documents can readily be subjected to the system. MIPS, on the other and, offers a good readability for Japanese users, since it allows scripting in Japanese language.

Although the SGML and MIPS have been chosen in the preferred embodiment, the present invention is not limited to these particular language specifications. As an alternative to SGML, the Extensible Markup Language (XML), for example, can be used to produce DTDs. Further, instead of MIPS, any interpreter languages can be used for scripting processes.

Messages transmitted in the system of FIG. 4 include the following four types:

(1) messages sent from the client process 61 to the processing engine 20 in response to the user's keyboard/mouse operations, (2) E-mail messages sent from processing engines in other systems (not shown in FIG. 4), (3) messages sent from the timer event processor 11 at a predetermined time of day, and (4) messages generated by a script in a management object to call up another script in a different management object.

Here, the client process 61 determines the destination nodes of the first type (1) of messages, based on the basis of the cursor position or mouse pointer position given by the user. The details will be described in a later section, with reference to FIG. 19.

The message delivery subsystem is a mechanism to transfer events, whose main functions are provided by the message processor 10. In the present embodiment, an electronic mail (E-mail) facility works as a vehicle of messages, where the message processor 10 acts as an SMTP server and POP server. The message processor 10 sends and receives E-mail messages 72 to/from the processing engine 20. The pending messages 72 are once saved in a message queue 71, and the message processor 10 processes them in a sequential manner. In the system illustrated in FIG. 4, the message processor 10 realizes inter-process communication across various business activities, interconnecting remote servers by using existing communication infrastructures. It is of course possible to use alternative mechanisms, as long as they can transfer event information necessary for the operations of the business support system.

The message queue 71 actually has two parts; one serves as the temporary storage for event messages, and the other serves as the storage for event log information. The first part of the message cue 71 keeps the messages, making a classification according to their originators. The stored information is used to check the present status of each process concerning individuals or some specialized groups. The second part, on the other hand, provides the system administrator with useful information for monitoring or managing the system. The timer event processor 11 generates a timer event at a specified time of day, in response to a request from the processing engine 20.

The business support processing subsystem plays a key role in the present embodiment. Note that the processing engine 20 contains no data or programs that directly relate to the business support functions. In fact, the operation of the processing engine 20 is wholly dependent on the definition of each management object. More specifically, the processing engine 20 is always activated by external events. Such trigger events include messages 72 and 75 sent from the message processor 10 and the client process 61, and timer event signals generated by the timer event processor 11. Depending on the content of each active process, a work list 74 written in the Hyper Text Markup language (HTML) is delivered from the processing engine 20 to the client process 61. This processing engine 20 is constructed within a World Wide Web (WWW) server, while the client process 61 is a WWW browser. Although FIG. 4 illustrates the processing engine 20 and client process 61 as separate entities, they can be implemented in a single machine.

The structured data management unit 21, together with the script interpreter 22, works as a server for the external environment outside the processing engine 20. It receives and manages SGML documents, or the structural definitions of management objects, to provide the script interpreter 22 with database services, responding to queries about nodes.

The script interpreter 22, on the other hand, parses and executes MIPS scripts which contain the process definition concerning each management object. The scripts offer database access functions and linkage with other systems, for example. They further provide instructions to the structured data management unit 21 for reading and writing SGML instances. Such instructions are called "operators," and one can create a new operator by combining two or more operators.

The management/control scripts 73 can be divided into three groups as follows. The first kind of scripts are used to control the processing engine 20. For example, one script is used to load SGML documents related to a management object into the structured data management unit 21. Another script enables a specific process script of a management object to be transferred to the script interpreter 22. Still another script supports copyright protection for the scripts of management objects.

The second kind of management/control scripts are used to process a class of messages concerning administrative operations for the business support system. For example, one script provides such an agent process that responds to a query received through the message delivery subsystem. Another script updates a management object by applying a difference file received from the message delivery subsystem. Still another script automatically sends regular reports in cooperation with the timer event processor 11. As in the above second example, the management objects (including structured data objects and associated process scripts) can be automatically delivered to different sites, in order to maintain the up-to-date environment for business operations. This automatic data delivery service can extend to other computers via networks.

The third kind of management/control scripts are used to record the history of events and messages that have been processed by the processing engine 20. The collected history records can be used variously. For instance, they are subjected to process analysis, documented as audit records, or supplied to an application for debugging purposes. This kind of management/control scripts, however, may be integrated into the processing engine 20 as its native function.

Regarding the security issues, the system may require appropriate facilities for access control, data security, and copyright protection. Modern cryptography and electronic signature techniques can optionally be introduced to the system to protect the management objects. Here, some management/control scripts 73 will be used to decipher the protected scripts and to test the authenticity of electronic signatures. Security mechanisms for process scripts should be implemented as an integral part of the processing engine 20. This protects the enterprise's business activities from disruptions which may be caused by unauthorized modification of important program sources.

The client environment allows the user to interact with the system through a graphical user interface (GUI) provided by the client process 61. The client process 61 is actually a WWW browser application. The client environment further provides the edit tool 62 and other software development tools, including: a text editor and viewer, a spreadsheet application, a graphics tool, and client functions of other systems. The client process 61 sends messages to the processing engine 20 in response to inputs from the user or the edit tool 62. Further, when a work list 74 is received from the processing engine 20, the client process 61 displays it on the screen of a monitor unit. Both the client process 61 and edit tool 62 are installed on a computer located at the user's site.

The above-described system configuration conforms to the Model View Controller (MVC) architecture. That is, the proposed business support system comprises management objects (Model), the processing engine 20 and management/control scripts 73 (Controller), and the client environment and message delivery subsystem (View).

From another point of view, the combination of the processing engine 20, management objects, and E-mail messages may be interpreted as a combination of people, their knowledge, and work instructions. That is, the above system configuration is an analogy of daily activities in a human organization. In this system, the processing engine 20 is positioned as an "agent" that carries out some jobs for the user. Since the system handles electronic data with a human-like concept and structure, the user can easily understand its behavior. Besides being robust and maintainable, the system permits the user to gradually implement required business support functions by giving his/her expert knowledge to the agent.

The proposed business support system can be tested by imitating its external environment. This is accomplished by reconfiguring the system of FIG. 4 so that the client process 61 will emulate the user operations and the message processor 10 will emulate E-mail message transmission, while leaving the business support processing subsystem as it is. Another method of enabling such a simulated operation of the system might be to modify some scripts in each management object to stimulate the DTD and SGML instances associated with the scripts.

In this way, the behavior of some particular processes that are directly coupled to the external environment is emulated on the computer. This produces simulated events and inputs, which activates the processes related to structured data objects stored in the business support processing subsystem. In this simulated operation environment, the system will output the result faster than in the real environment.

Figure 5:
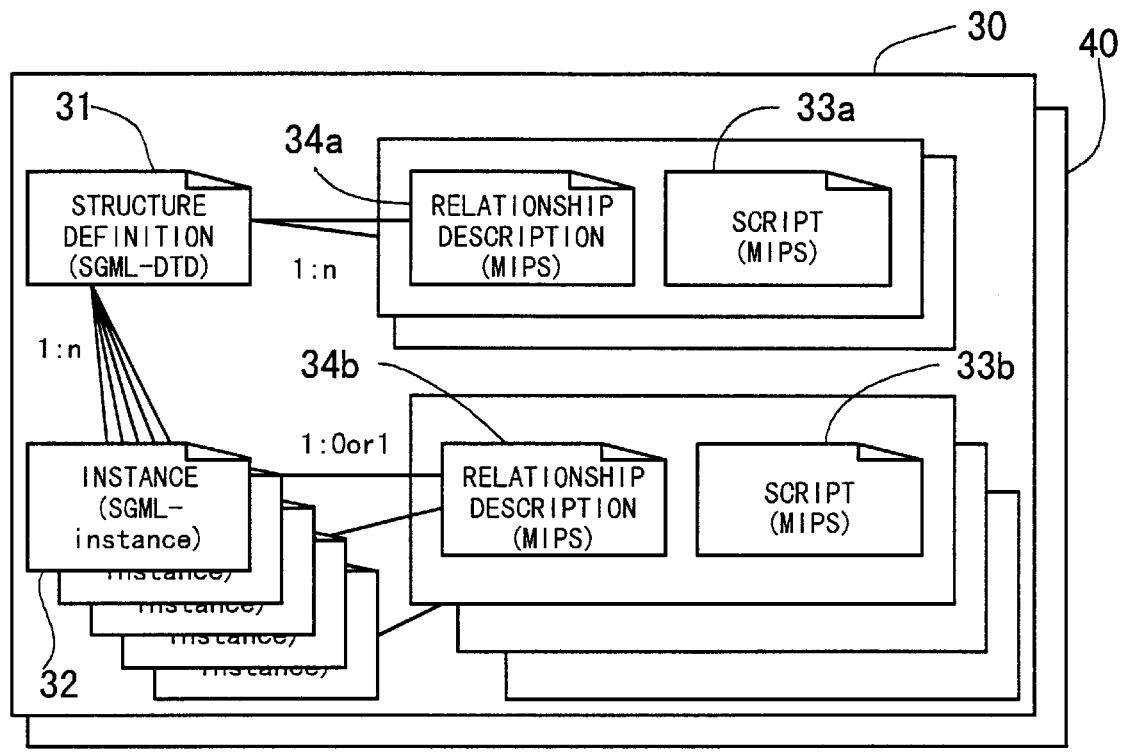
FIGS. 5(A) and 5(B) are diagrams which provide supplementary information about management objects.
Figure 5:
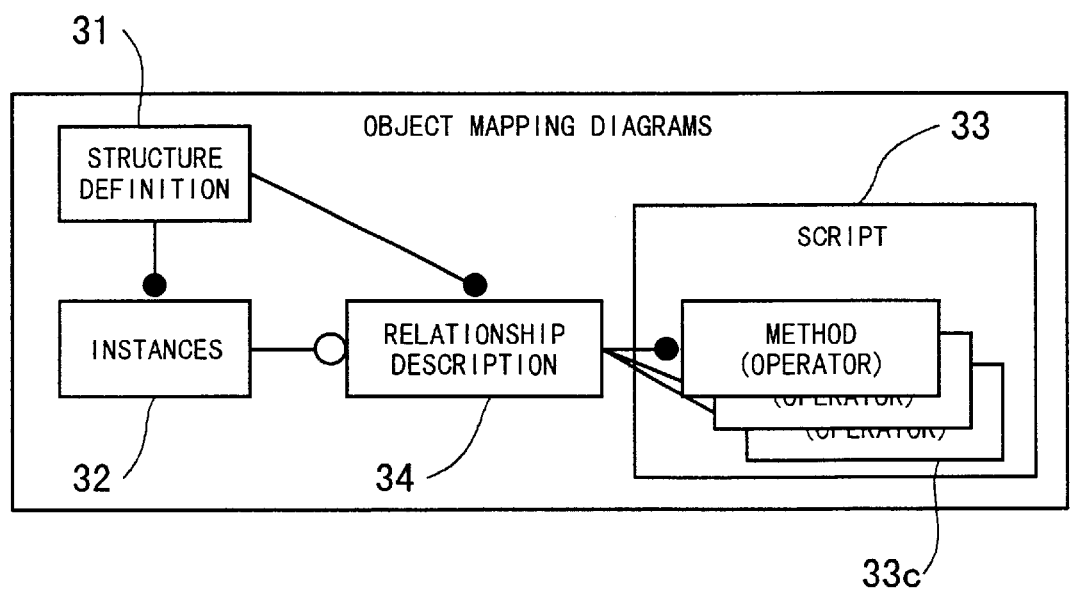

FIGS. 5(A) and 5(B) are diagrams which provide supplementary information about management objects. FIG. 5(A) illustrates a management model 30 and relationships among its components, which include: a structure definition 31 (SGML-DTD), its instances 32 (SGML-instances), process scripts 33a and 33b (MIPS scripts), and relationship descriptions 34a and 34b (MIPS scripts). FIG. 5(B) shows the same relationships in the form of an object mapping diagram, which follows a common notation of cardinality constraints.

As shown in FIGS. 5(A) and (B), each script 33 contains one or more "methods" 33c, where the term "method" is used as a synonym of the aforementioned "operator." This script 33 corresponds to what is referred to as the "process script" being associated with each node within a structured data object shown in the conceptual view of FIG. 1. In the present invention, scripts can be associated with the structure definition 31, the instances 32, or both. More specifically, some elements of the structure definition 31 are associated with the scripts 33a through the relationship descriptions 34a, and some elements of the instances 32 are associated with other scripts 33b through the relationship descriptions 34b. Hereafter, the former scripts 33a will be called "model-specific methods," and the latter scripts 33b will be called "instance-specific methods."

The above object mappings make it possible to define some common model-specific methods representing such processes that will be shared by the same kind of nodes included in all instances. On the other hand, a process corresponding to a particular node in a particular instance will be defined as an instance-specific method. In this way, the proposed system clarifies the meaning and scope of each process.

The model-specific methods will determine the system's default operation, when there are no conflicting definitions of instance-specific methods. For example, a model-specific method associated with the structured data object "Business Process" offers a class of business support functions that are beneficial to almost all departments and sections. Additionally, each individual department or section can develop its own specialized support function by preparing instance-specific methods.

Another usage of model-specific methods might be a copyright protection of all SGML instances under a specific DTD. To implement this function, one should define an operator (or a model-specific method) that will add an electronic signature as an attribute of the SGML instances, and also place a relationship between the operator and relevant elements in the SGML instances. On the other hand, the copyright protection for a particular SGML instance will be accomplished by simply assigning the above operator to the SGML instance as an instance-specific method.

The present embodiment manages the object relationships in table form. Actually, the relationship descriptions 34, 34a, and 34b shown in FIGS. 5(A) and 5(B) are table-based definitions of relationships. The relationship descriptions 34a and 34b contain one or more table entries. When an element of the structure definition 31 or a node in the instances 32 is given, these table entries are used to identify a specific method that is associated with the given element or node.

Figure 6:
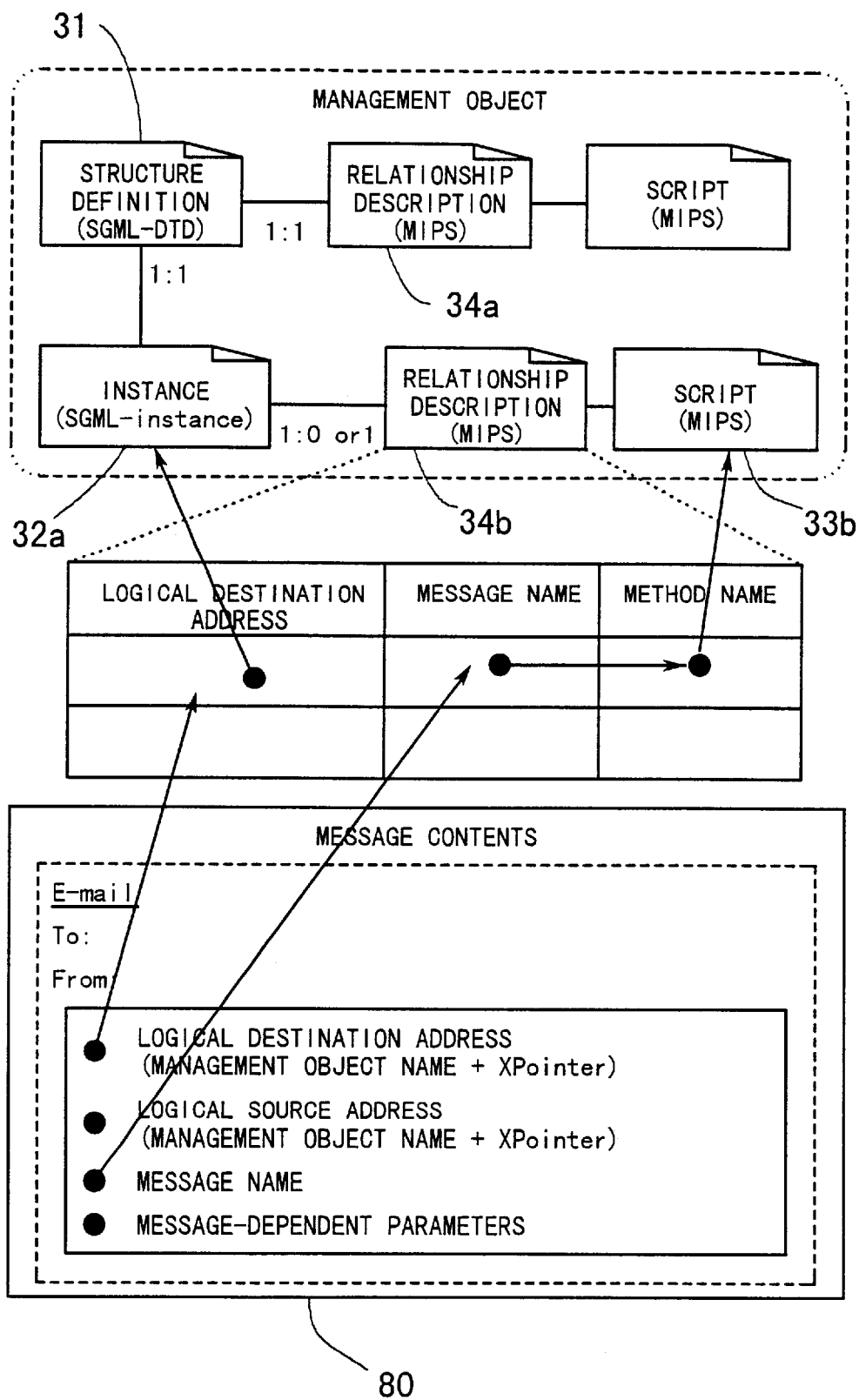
FIG. 6 is a diagram which shows what a relationship description contains.

FIG. 6 shows the contents of a relationship description. To simplify the execution of process scripts, the relationship descriptions 34a and 34b are constructed in the form of a table having three data fields named "logical destination address," "message name," and "method name." As these names imply, a kind of message handling mechanism is employed to control the flow of a process which is passed from node to node. Just as in the case of an external message stimulating the system, a message issued from a node, or object, causes a transition of process flow.

The logical destination address is a combination of a management object name and a locator (e.g., XPointer) that specifies a node to the structured data management unit 21.

The message name is used to determine the message types. Each message has different parameters depending on what kind of message it is. The method name indicates which method to choose and execute, from among those in a given script.

FIG. 6 illustrates a message 80 containing a logical destination address, a logical source address, a message name, and message-specific parameters. The processing engine 20 uses this information to reach the destination node and to read out the specified script, referring to a relevant relationship description. In the present embodiment, the relationship descriptions are prepared as separate data. Alternatively, they can be integrated into the structure definition or instances, and if this is the case, they are not necessarily defined in the form of tables.

Referring now to FIGS. 7 to 14, the following paragraphs will present the details of the organization model 40, documentation system model 50, and business process model 30 shown in FIG. 4.

Figure 7:
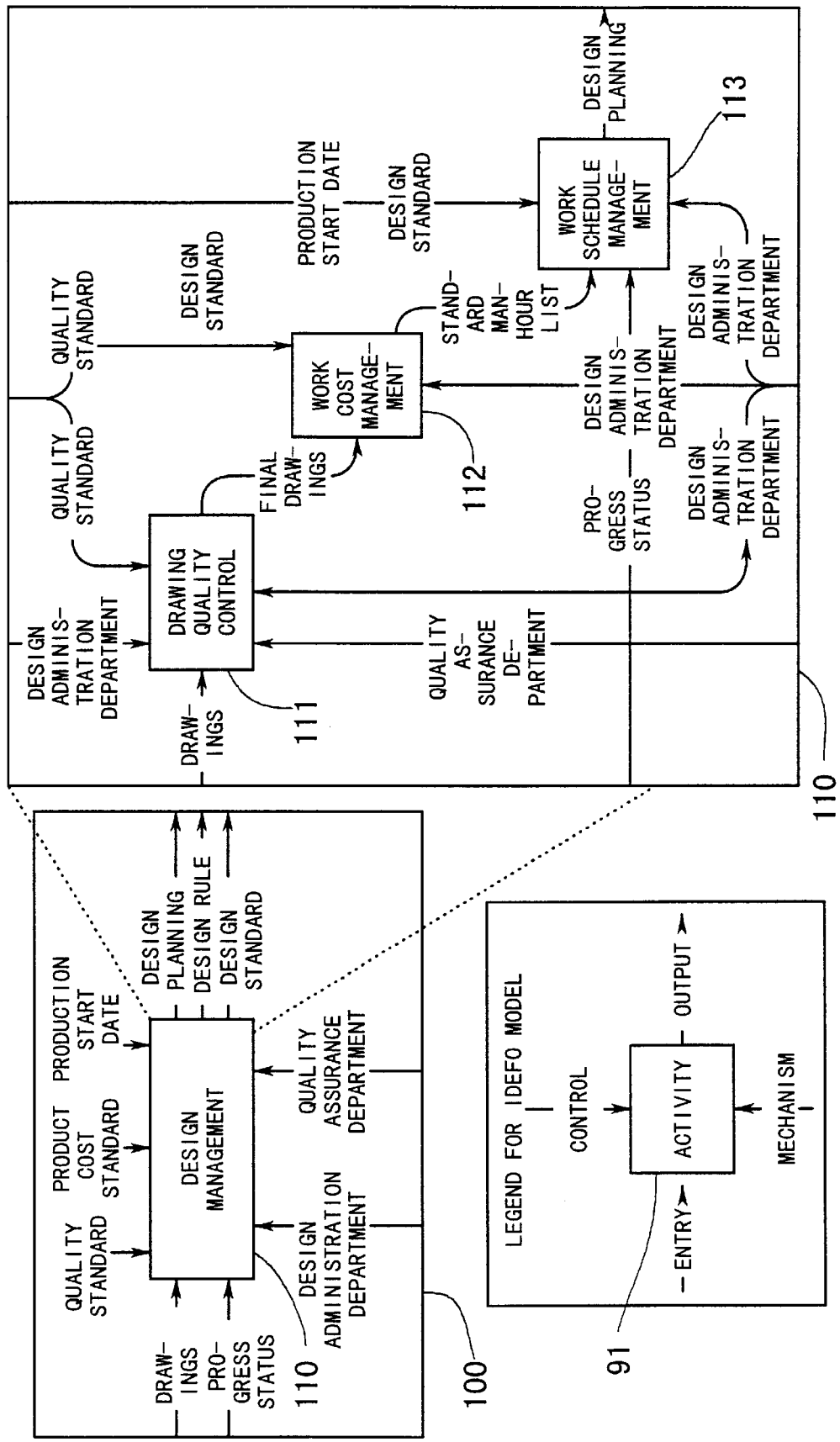
FIG. 7 is a diagram which shows an example of business process model formulated according to the IDEF0 notations.

In the present invention, a modeling methodology called the "Integrated Computer-Aided Manufacturing Definition Method 0" (IDEF0) is used to profile business operations in an enterprise. Once a business process model is formulated, it is then described in the SGML language specification. FIG. 7 shows an example of a business process model according to the IDEF0 notation. As illustrated in the legend at the lower-left corner of FIG. 7, each process unit, or activity, is represented as a single box 91, and input/output information to/from the process unit is indicated by four arrows in a classified way. They include; a left-side incoming arrow indicating inputs to the process, a top-side incoming arrow indicating control inputs that governs the process, a right-side outgoing arrow indicating outcomes of the process, and a bottom-side incoming arrow indicating mechanisms used in the process. This box, together with its associated arrows, is a basic unit of process representation. Every process flow is defined by placing boxes and connecting them with appropriate arrows. Even a hierarchical concept of processes can be expressed by using the same notation.

In the present example, an activity "Design management" 110 is on the top level (or top layer) of a business process model 100. Defined on the second level are the following three activities: "Drawing Quality Control" 111, "Work Cost Management" 112, and "Work Schedule Management" 113. Actually, these second-level activities 111 to 113 have their respective lower-level structures.

FIGS. 8(A) to 8(C) show the internal structure of activities on the second level. FIG. 8(A) means that two child activities, "Design Check" 111a and "Design Rule Check" 111b, are defined under the parent activity "Drawing Quality Control" 111. Likewise, as FIG. 8(B) shows, there are two child activities, "Development of Design Rules and Standards" 112a and "Standardization of Workflow" 112b, under the activity "Work Cost Management" 112. Further, under the activity "Work Schedule Management" 113, there are two child activities, "Planning of Daily Schedule" 113a and "Progress Management" 113b, as shown in FIG. 8(C). In this way, activities are defined in a hierarchical fashion.

FIG. 9 shows a structure definition of the business process model in more details. A structure definition 31 of a business process is provided as a DTD file presented in the upper half of FIG. 9. The concept described in this structure definition 31 can be pictured alternatively in a tree structure, as shown in the lower half of FIG. 9. In this example, an abstract concept named "Business Process" is defined at the root node, and its elements are defined as lower-level nodes. The structure definition 31 conforms to the IDEF0 modeling specification, where the element named "Resources" means what is called "mechanisms" in the IDEF0 terminology. Operators 33aa to 33ae are defined in association with the nodes 31a to 31e.

FIG. 10(A) shows the script of the operator 33aa associated with the "Activity" node 31a, and FIG. 10(B) shows a relationship description 34a for the structure definition 31. In this example, a method (or operator) named "Close Work" is defined as a common default operation that is applicable to all instances of the "Activity" (e.g., "Design Management" and "Work Schedule Management"), because it is associated with the "Activity" node 31a as a model-specific method.

FIG. 11 shows the definition of "Design Management" 32a, an instance of the business process model. The content of this instance 32a can be represented as a tree structure as shown in the lower half of FIG. 11, while the definition itself is written in SGML as shown in the upper half of FIG. 11.

In a similar way, the following section will present several examples of detailed definitions of the organization model and documentation system model.

Figure 12:
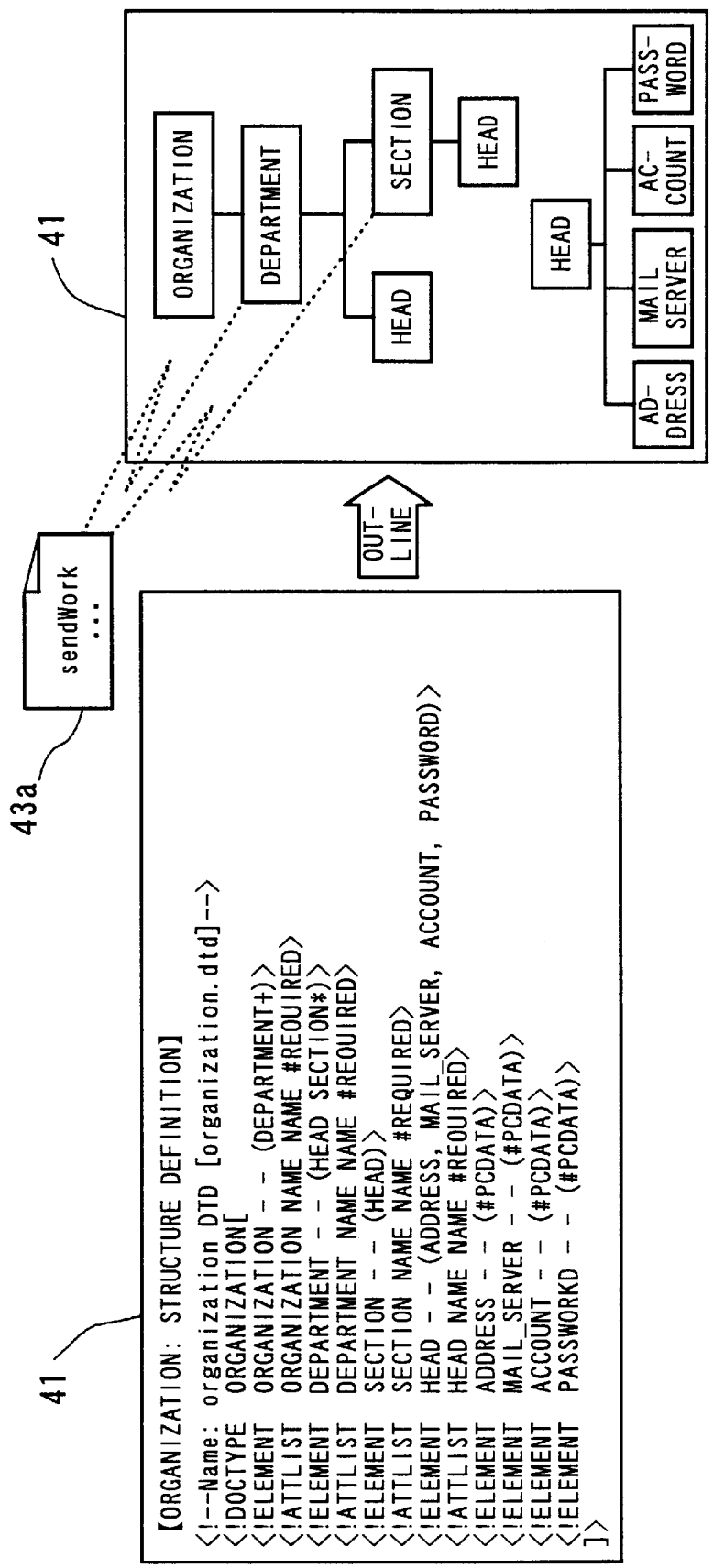
FIG. 12 is a diagram which shows a structure definition of an organization model.

FIG. 12 shows a typical structure definition 41 of the organization model, its DTD description on the left and its tree-structure representation on the right. In connection with this structure definition 41, two element nodes "Department" and "Section" in the "Organization" are associated with a common operator 43a. FIG. 13(A) is the definition of this operator 43a, while FIG. 13(B) shows a relationship description 44a that defines the above node-to-operator association. More specifically, the structure definition 44a has two entries corresponding to the elements "Department" and "Section," both of which include a message name "Send Work" and an operator "Send Work." In this way, the operator 43a of FIG. 13(A) is associated to both of the two elements "Department" and "Section."

FIG. 14 shows the definition of "Design Office" 42a, an instance of the organization model 40. The upper half of FIG. 14 shows an SGML-based definition of this "Design Office" instance 42a, while the lower half of FIG. 14 depicts the same in tree structure form.

Figure 15:
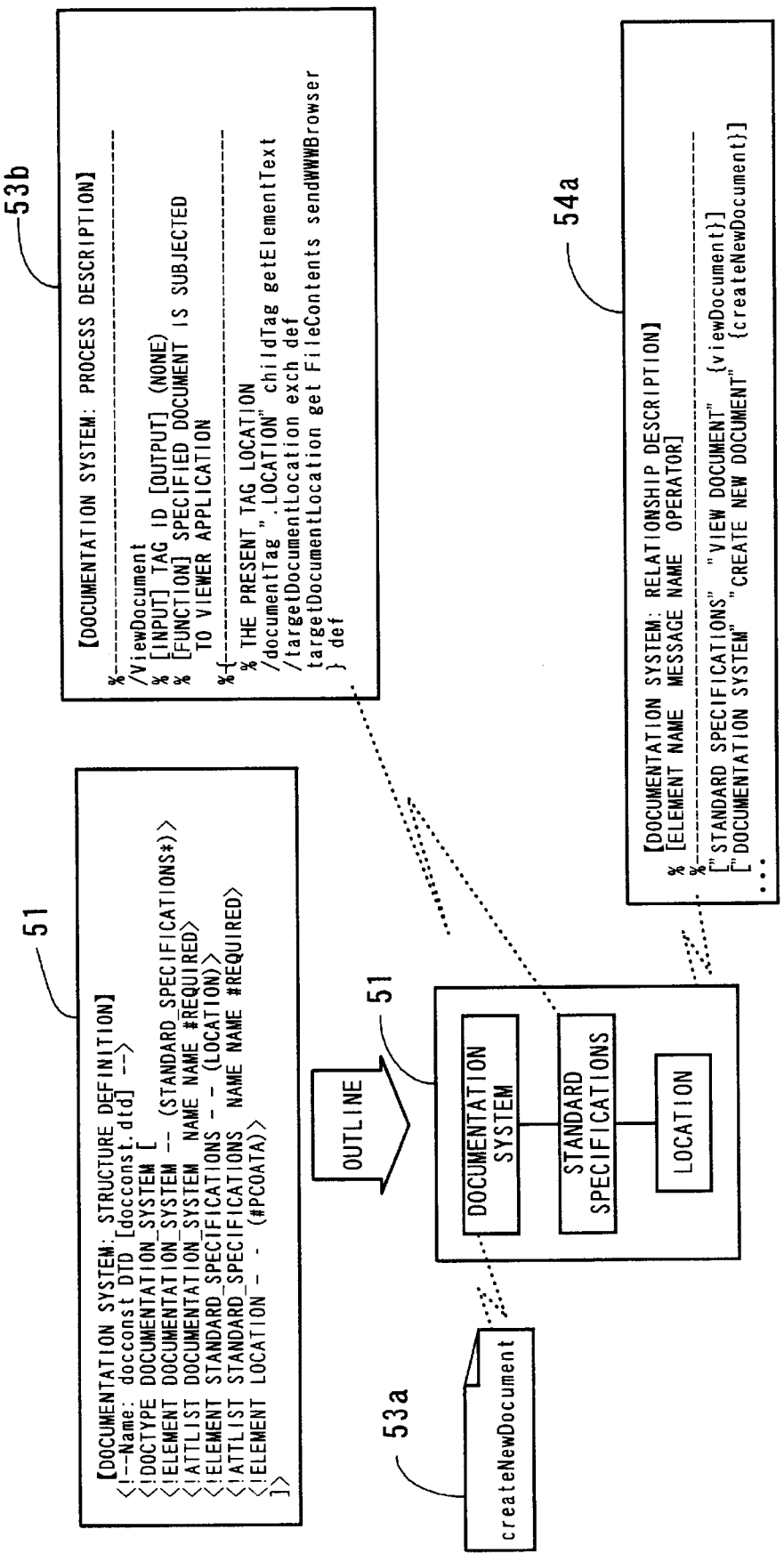
FIG. 15 is a diagram which shows a structure definition, an operator, and a relationship description to define a documentation system model.

FIG. 15 presents an example of the documentation system model 50, which includes its structure definition 51, its relationship description 54a, and operators associated with its elements. According to the structure definition 51, the documentation system model 50 contains three elements named "Documentation System," "Standard Specifications," and "Location." The relationship description 54a associates a "Create New Document" operator 53a with the first element "Documentation System," and a "View Document" operator 53b with the second element "Standard Specifications."

Figure 16:
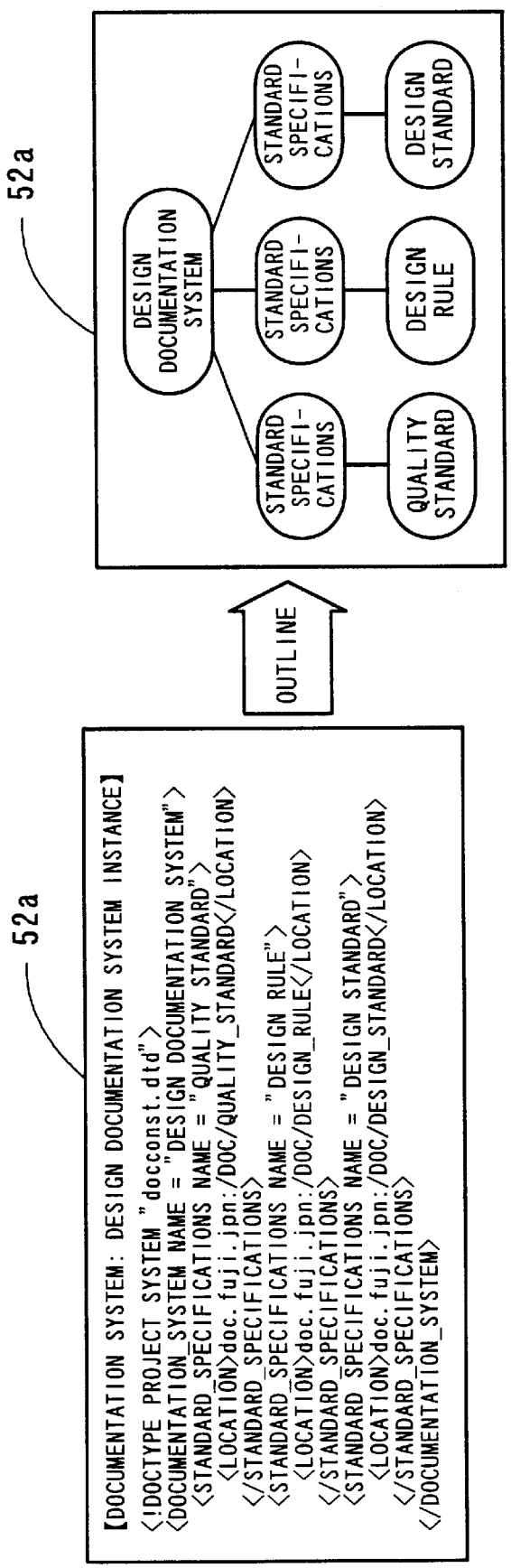
FIG. 16 is a diagram which shows an instance of the documentation system model.

FIG. 16 shows an instance 52a of the documentation system model 50, which is named "Design Document System." On the left is an SGML-based definition of this instance 52a, and on the right is a tree structure that visualizes the same.

Now, the following section will describe the operation of the present embodiment, citing the preceding figures (FIGS. 4 to 16) for reference.

Figure 17:
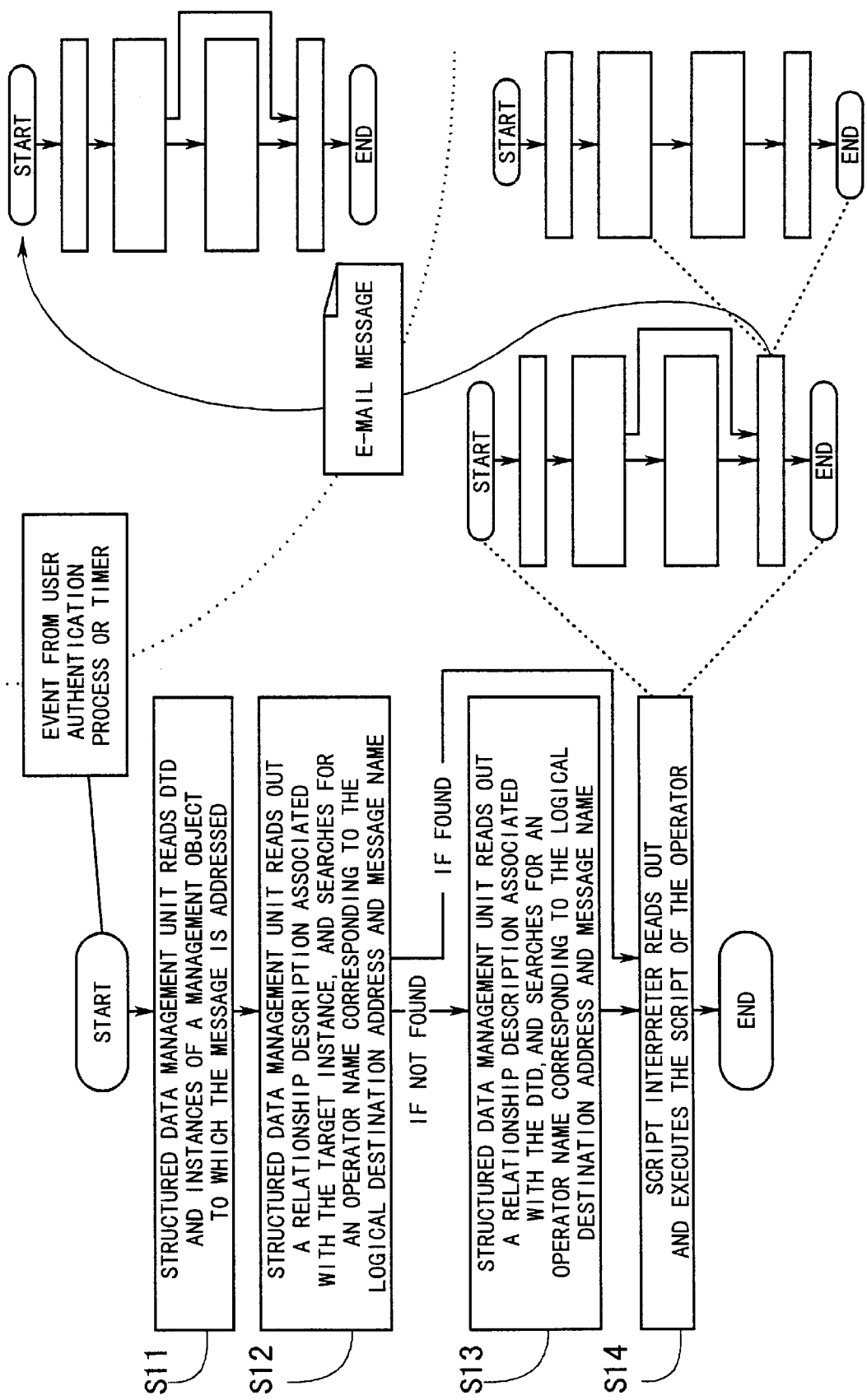
FIG. 17 is a flowchart which shows a message handling process executed by a processing engine.

FIG. 17 is a flowchart which shows a message handling process executed by the processing engine 20. As described earlier, the script interpreter 22 in the processing engine 20 receives event messages from external sources such as a user authentication process and the timer event processor 11, according to the management/control script 73 being loaded. The flowchart of FIG. 17 describes how the script interpreter 22 manipulates those incoming messages. The next section explains this process flow, assuming the system configuration of FIG. 4.

First, the structured data management unit 21 reads the DTD and instances of a management object to which the message is addressed (Step S11). Next, the structured data management unit 21 reads out a relationship description associated with the target instance. It then searches the relationship description for an entry that matches with the logical destination address and message name contained in the message, in an attempt to obtain the name of an operator that should be executed (Step S12). If a relevant entry is found in the relationship description, the process skips to step S14. Otherwise, it proceeds to step S13. When no relevant entry is found, the structured data management unit 21 searches another relationship description associated with the DTD to find an entry that matches with the logical destination address and message name contained in the message (Step S13). As a result of the data search conducted in step S12 or S13, the script interpreter 22 now has the operator name at hand. Accordingly, it reads out and executes the script of that operator. (Step S14). If it encounters a message to another element during the execution of the script, the script interpreter 22 spawns another process, and this child process deals with the new message in the same way as above. Note that the message can be transmitted as an E-mail message to another node, as shown in FIG. 17. The above steps are repeated until all messages are finished.

It should be noted here that in the process flow of FIG. 17, instance-specific methods take priority over model-specific methods. This permits the default behavior of element nodes to be defined as model-specific methods. It should also be noted that FIG. 17 illustrates only a principle of operation, but in actual implementations, one should take into consideration the performance and security issues.

Figure 18:
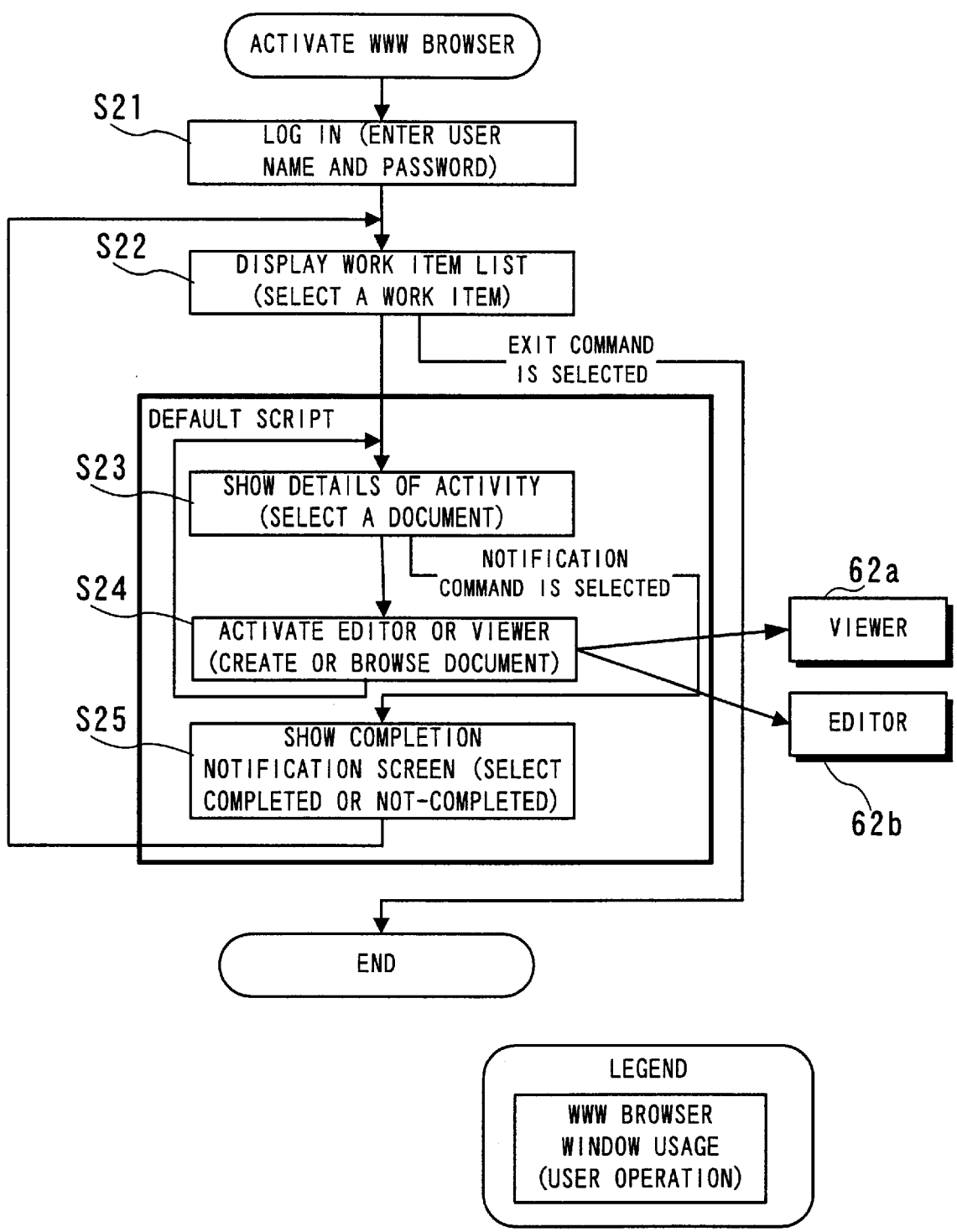
FIG. 18 is a flowchart which shows how the processing engine interacts with a user.

FIG. 18 is a flowchart which shows how the processing engine 20 interacts with a user. This might be one the simplest examples of business support functions, which utilizes the default behavior definition provided by the model-specific methods. The client process 61 executes this sequence of FIG. 18, exchanging information with the processing engine 20. The next paragraph explains each step of the process, referring to FIG. 4 in addition to FIG. 18.

First, the user activates the client process 61 (WWW browser) and logs in to the processing engine 20 (WWW Server) (Step S21). In this log-in procedure, the user is requested to enter his/her user name and password. When the user has successfully logged in to the system, the processing engine 20 returns a list of activities to the client process 61. This list is called a "work item list" 74, which shows every possible activity (or work item in the present case) related to the user.

Upon receipt of the work item list 74 from the processing engine 20, the client process 61 displays it on the screen of a computer that the user is viewing (Step S22). On the computer screen, the user can check every work item that has been delivered through the E-mail facility, while some of the displayed items might not have sufficient resources for the user to start working. The user now selects one item out of the work item list 74 on the screen. This item selection will invoke the execution of a script that provides default business support functions. The process, in turn, will be closed when the user enters an exit command. Note again that the default script has to be provided as model-specific methods.

Now that the user has selected a work item, the client process 61 sends a "Show Work Details" message 75 to the activity corresponding to the selected work item. In response to this message 75, the processing engine 20 executes a "Show Work Details" operator, and as a result, detailed information on the selected work item is sent back to the client process 61. The client process 61 displays this information on the screen (Step S23). Browsing through the displayed information, the user chooses a document to manipulate, or alternatively, he/she makes a notification to the system as will be described later.

When the user has selected a document, the client process 61 then sends a prescribed message, such as "Show Document Details," to a node associated with the document that the user has selected. In response to this message, the processing engine 20 executes a relevant operator and returns the result to the client process 61. The client process 61 then chooses an edit tool 62 suitable for the selected document and activates it as a separate process (Step S24). This edit tool 62 is, for example, a viewer 62a or an editor 62b.

Upon completion of his/her work with the edit tool 62, the user returns to the activity screen of step S23 and notifies the system of the completion. The client process 61 then presents a selection screen, where he/she is prompted to answer whether his/her output document has completed or not (Step S25). When the user selects a "Completed" button, the completion indication is transmitted to the next activity. On the other hand, no information is transmitted, in principle, when the user has selected a "Not Completed" button. It is, however, possible to configure the system to send some notification to the next activity, if a certain condition defined in a script is satisfied. When this step S25 is finished, the process returns to step S22 to display again a work item list. The steps S22 to S25 are then repetitively executed, until the user enters an exit command on the work item list screen.

More specific and detailed explanation of the above interaction will now be provided below, with reference to some example screens displayed by the client process 61.

Figure 19:
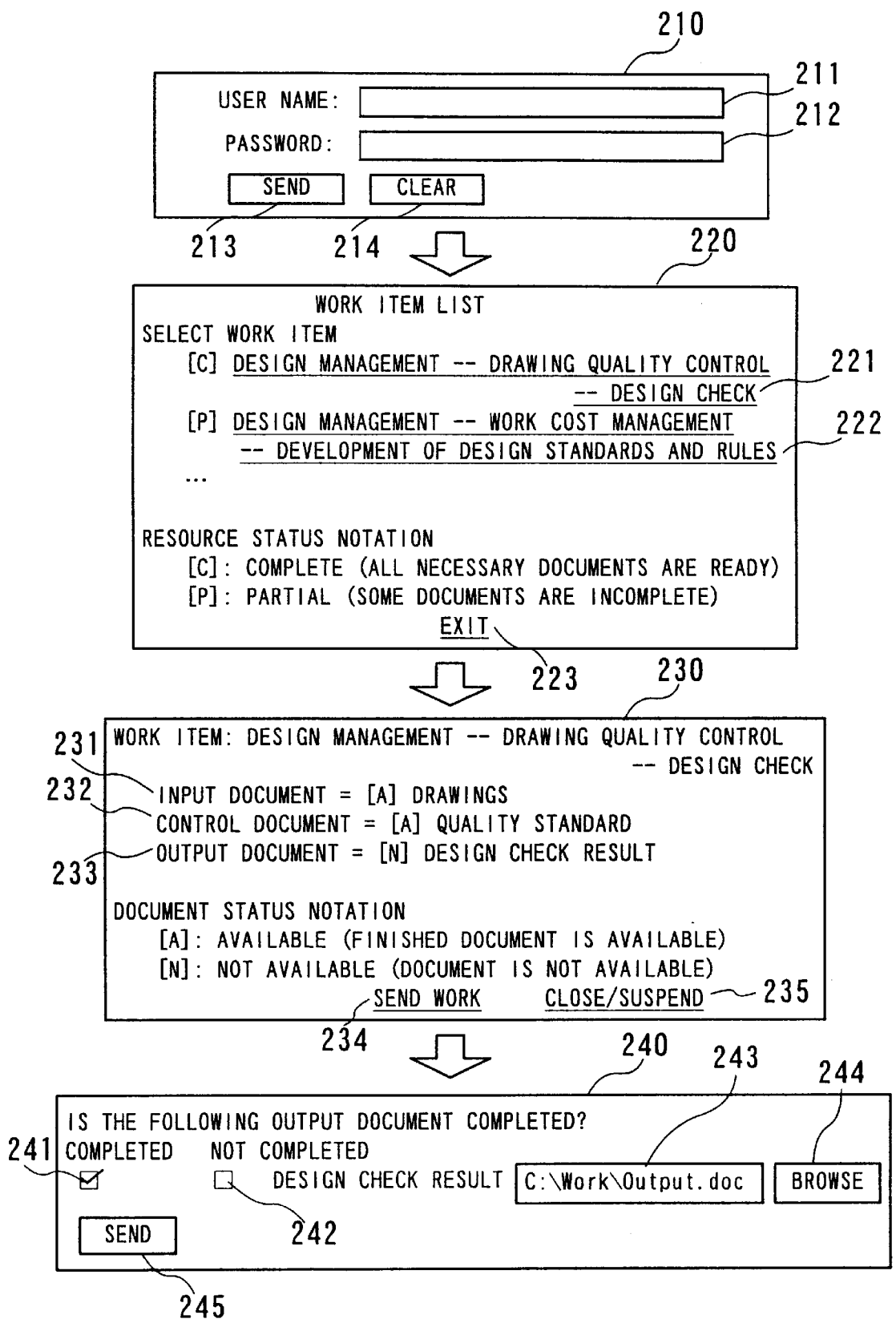
FIG. 19 is a diagram which shows example screens that appear in the interactive process of FIG. 18.

FIG. 19 shows a series of example screens that would appear in the interactive process. In the log-in procedure (Step S21 in FIG. 18), a log-in screen 210 appears as the initial screen of the client process 61, which has a "User Name" input box 211 and a "Password" input box 212. The user enters his/her user name and password into these two boxes and clicks a "Send" button (i.e., places the mouse pointer on an on-screen button named "Send" and presses a mouse button). This operation directs the client process 61 to transmit the entered user name and password to the processing engine 20, thus conducting user authentication. The log-in screen 210 has a "Clear" button 214 to erase the present text entry in both the "User Name" input box 211 and "Password" input box 212.

If the user authentication process is successfully finished, the processing engine 20 supplies a work item list 74 to the client process 61. The client process 61 displays this list 74 on a "Work Item Lists" screen 220. In the present context of FIG. 19, this screen 220 proposes two work items 221 and 222 to the user. The first item 221 is what is shown in FIG. 8(A) as the "Design Check" activity 111a, which is a child activity of the "Drawing Quality Control" activity 111 (FIG. 7) within the "Design Management" activity 110 (FIG. 7) defined as an instance of the business process model. The second item 222 is what is shown in FIG. 8(B) as the "Development of Design Rules and Standards" activity 112a, which a child activity of the "Work Cost Management" activity 112 (FIG. 7) in the "Design Management" activity 110 (FIG. 7). An indicator is placed at the head of each work item 221 and 222 to show whether all necessary resource documents are ready or not. As the foot note on the screen 220 describes, a letter "C" means that all necessary documents are finished and ready for use in the corresponding work. A letter "P", on the other hand, indicates that some necessary documents are not ready.

At the bottom line of the screen 220, a text string "Exit" 223 is placed to allow the user to exit from the present work with a mouse click on it. Note that the underlined text strings on the screens 220 and 230 are so-called hyperlinks, which enables the user to select items or trigger some actions by making a simple point-and-click operation with his/her mouse.

Figure 8:
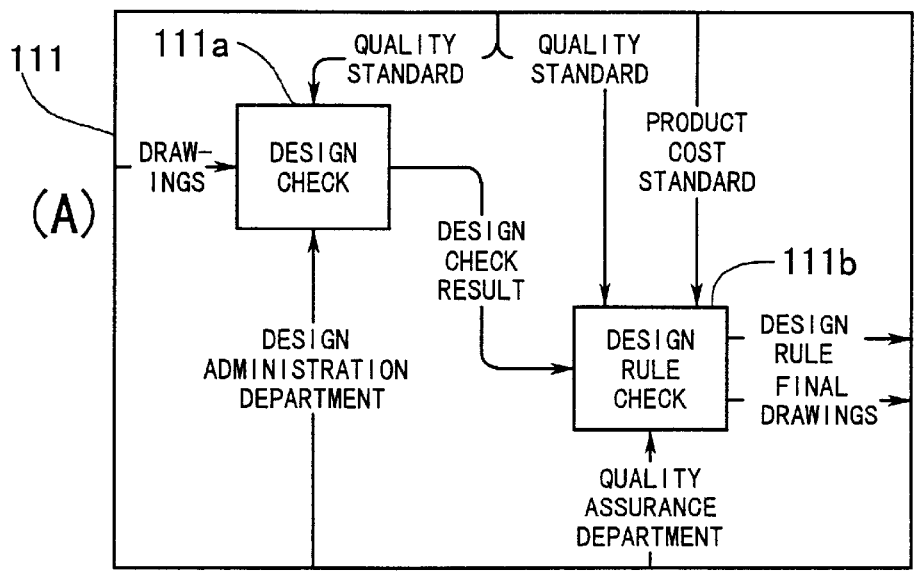
FIGS. 8(A) to 8(C) are diagrams which show the internal structure of activities on the second level.
Figure 8:
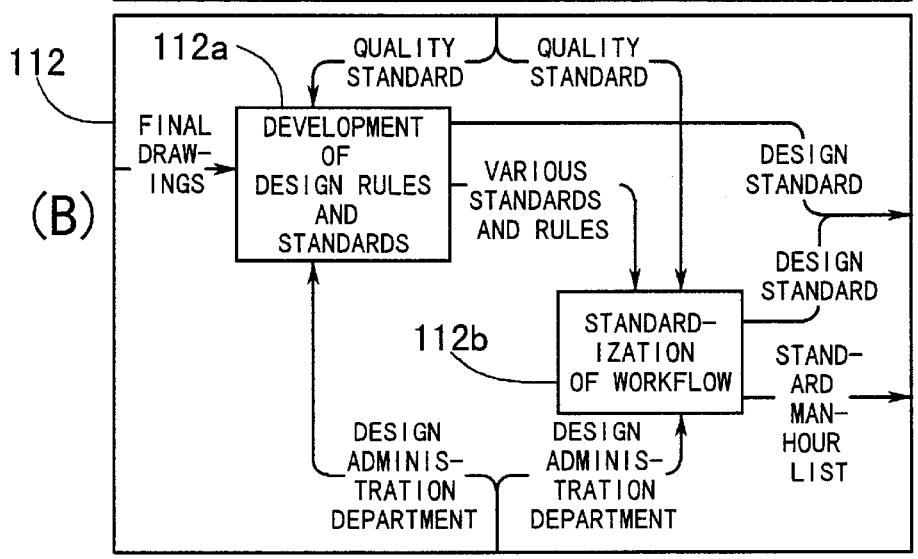
Figure 8:
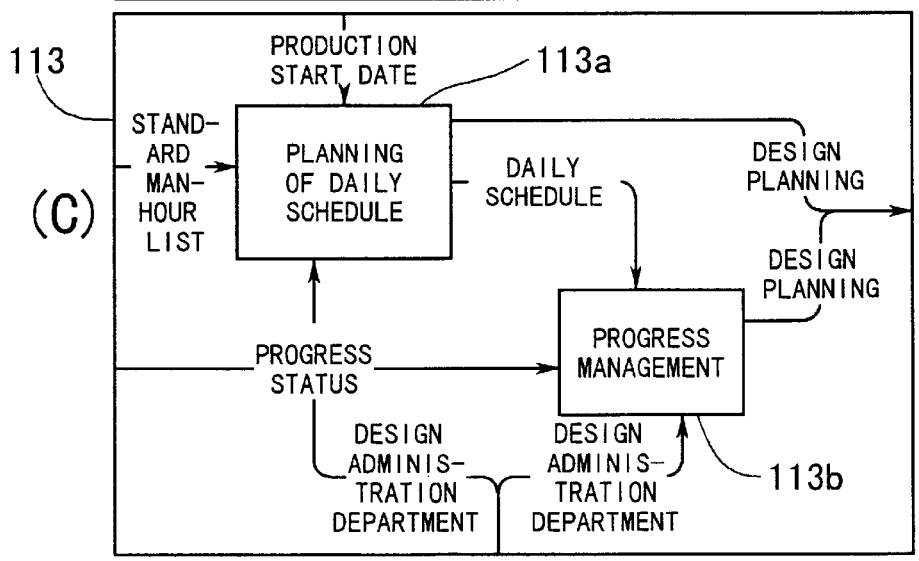

Suppose here that the user has selected the "Design Check" work item 221. In response to this selection, the client process 61 sends a "Show Work Details" message to the node representing the "Drawing Check" activity 111a (FIG. 8). Since no instance-specific methods are associated with this "Drawing Check" node, the "Show Work Details" operator, a method common to all activity instances, is executed (See relationship description 34a in FIG. 10). As a result of this execution, a work details screen 230 appears on the monitor, where the user obtains the detailed information on the "Drawing Check" work he/she selected (See step S23 in FIG. 18).

The work details screen 230 shows the names of an input document, control document, and output document in their respective display sections 231, 232, and 233. An indicator is placed at the head of each section to show whether the document is available or not. As the notation describes, a letter "A" means that the document is available, while a letter "N" indicates that the document is not available.

On the bottom line of the work details screen 230, there are two text strings that reads as: "Send Work" 234 and "Close/Suspend" 235. The former text string 234, if selected, will allow the user to assign the present work to another person. The latter text string, on the other hand, will bring the process flow to step S25 in the flowchart of FIG. 18.

Suppose here that the user has selected a text string "Drawings" on the present screen 230. In response to this selection, the client process 61 sends a "Show Document Details" message to the "Input Name" node of the "Design Check" business process instance. The message activates the script interpreter 22 in the processing engine 20 to execute a "Show Document Details" operator, which is a method common to all "Input Name" instances. In addition to this, a viewer application is invoked in the user's computer environment, thereby displaying the detailed contents of the "Drawings." Note here that every activity produces its output, which means that the activities will not terminate themselves, until they finish output documents.

Upon completion of his/her work, the user selects the "Close/Suspend" on the work details screen 230. The client process 61 then displays a completion notification screen 240 to ask whether the user has finished the output document. On this screen 240, two check boxes, "Completed" 241 and "Not Completed" 242, are presented to the user, prompting him/her to select either one. When the user has a data file containing the result of design check, he/she has to enter the folder and name of the file into a text box 243, in addition to selecting the "Completed" check box 241. Clicking a "Browse" button 244 on the right of the text box 243 will call up a file selection window, which shows the directory structure of the computer in which the client process 61 is running, together with a file list in the current directory. The user can select a specific file from this list, instead of directly typing a directory name and file name and into the text box 243. A "Send" button 245 is placed on the bottom of the screen 240. When the user clicks this button, the client process 61 sends a notification message to the processing engine 20 to whether the output document is finished or not.

Figure 20:
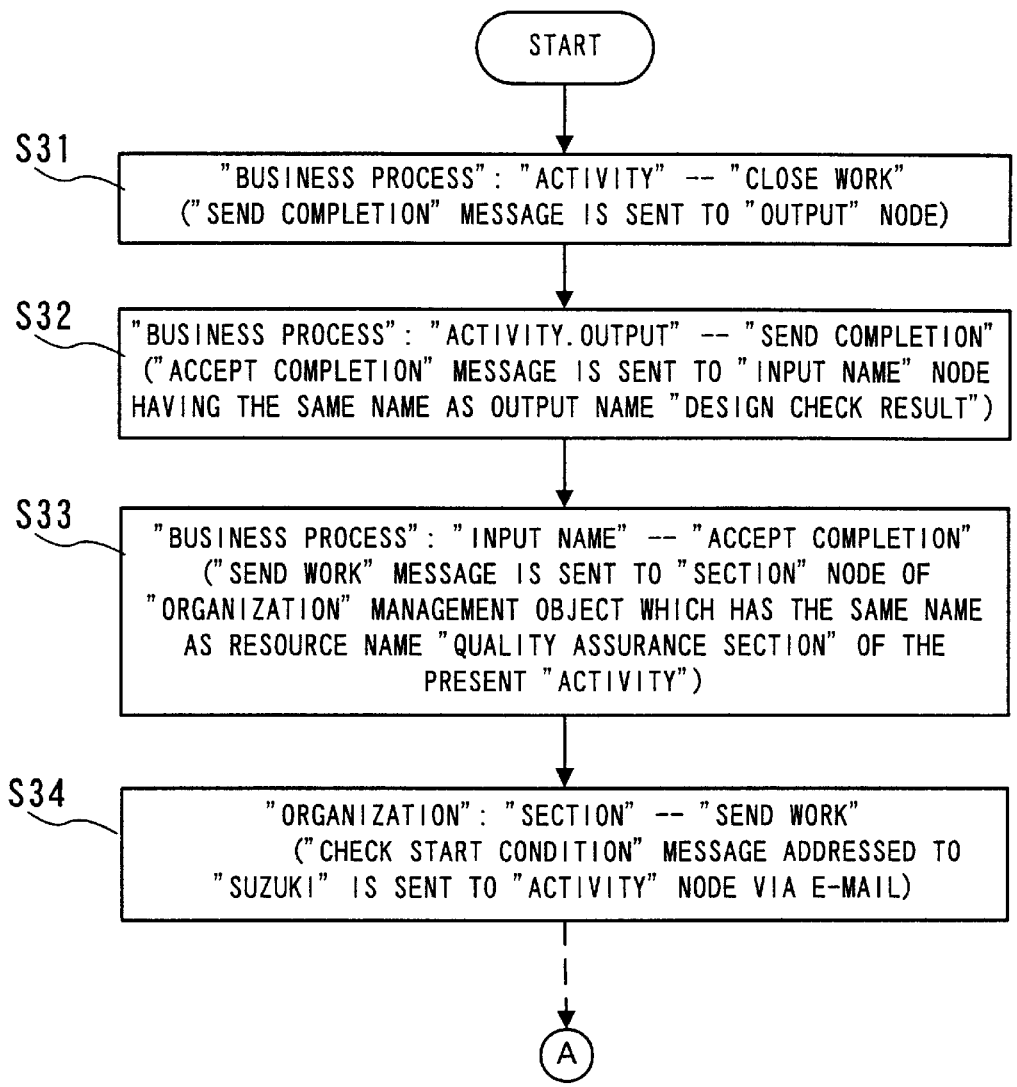
FIG. 20 is a flowchart which shows a process executed when a staff in Design Administration Department logs in to the system.
Figure 21:
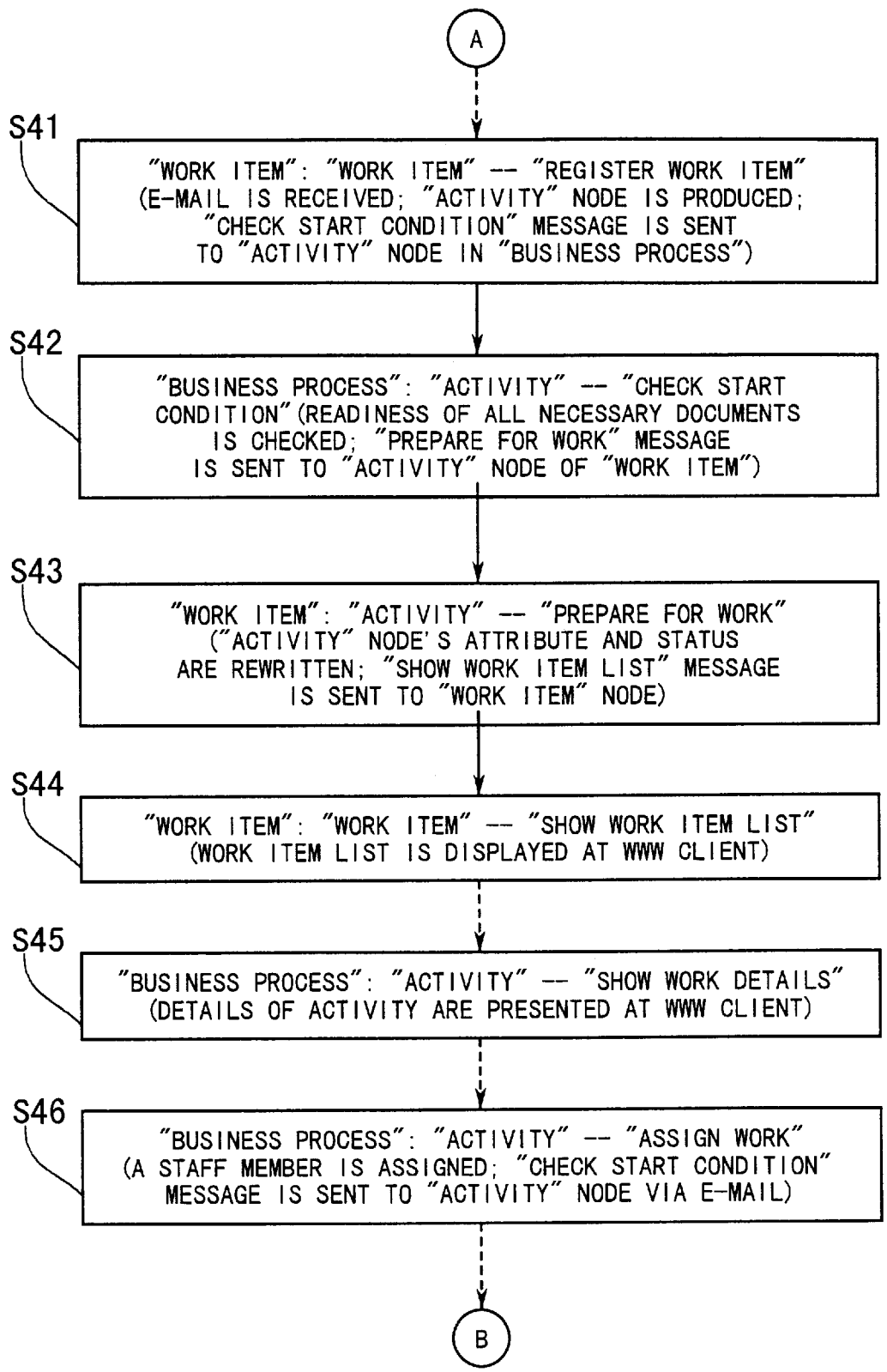
FIG. 21 is a flowchart which shows a process executed when the chief of Quality Assurance Section logs in to the system.
Figure 22:
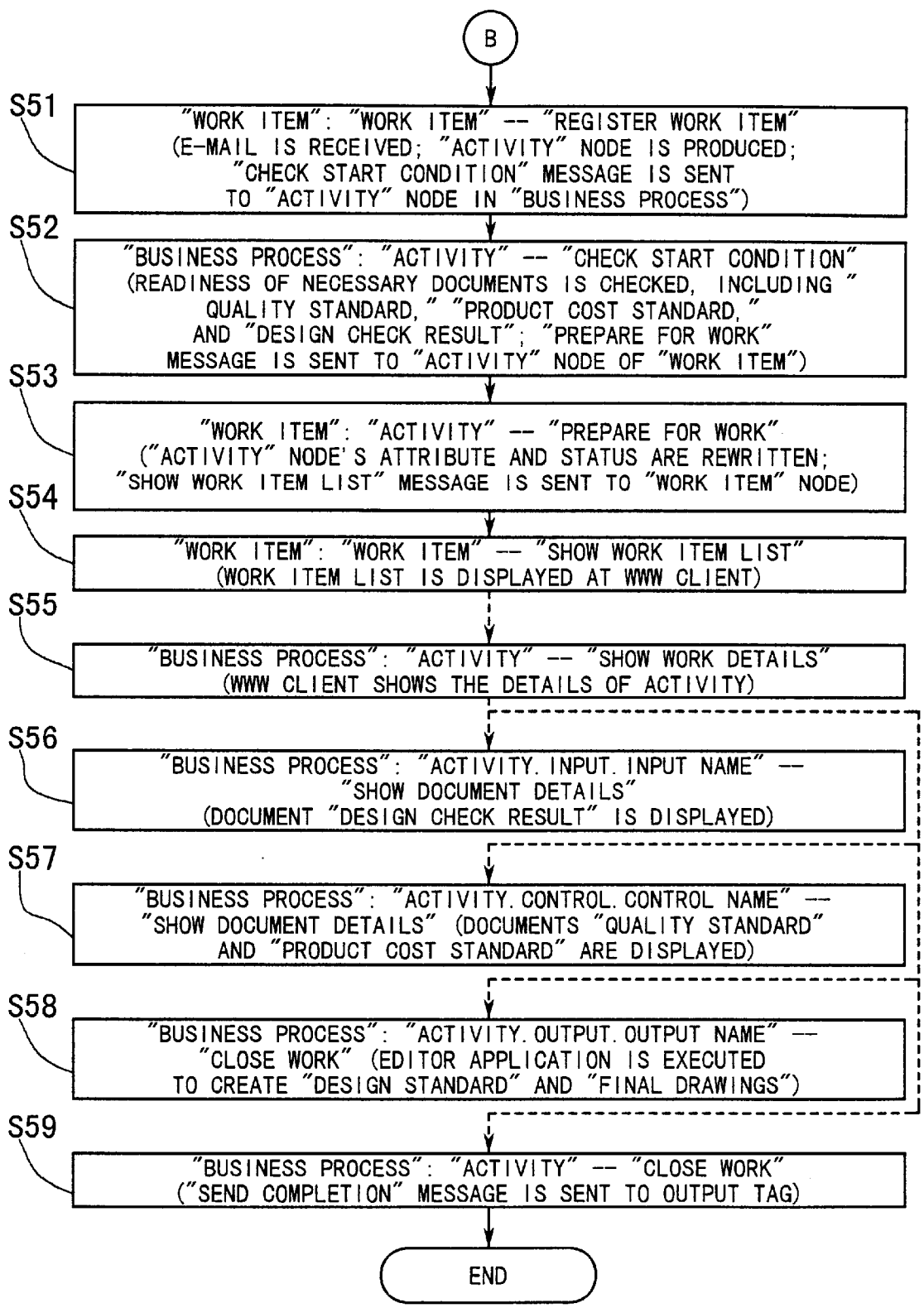
FIG. 22 is a flowchart which shows a process executed when a staff in Quality Assurance Section logs in to the system.

Recall here that in the "Drawing Quality Control" activity 111 of FIG. 8(A), the "Drawing Check" activity 111a runs first and then the "Design Rule Check" activity 111b follows. Referring next to FIGS. 20 to 22, the details of these two activities will be explained below, according to the order of operators to be activated.

FIG. 20 is a flowchart which shows a process executed by the processing engine 20 to help a staff in the Design Administration Department who has logged in to the system. The explanation will follow the step numbers affixed to each box in this flowchart. As the legend of FIG. 20 describes, bold arrows indicate the process transitions caused by messages sent from scripts; broken arrows indicate the process transitions caused by E-mail messages; dotted arrows indicate the process transitions caused by messages generated by user operations. Each box contains the name of a specific operator that is executed by the processing engine 20, as well as showing the resulting effects in parentheses.

In brief, the steps S31 to S59 describe the following situation. First, a staff in the Design Administration Department finishes his/her assignment, "Drawing Check." Upon receipt of the design check results, the chief of the Quality Assurance Section assigns one of his/her staff for the next activity, "Design Rule Check." The appointed staff then executes this task with the assistance of the system.

(S31) The processing engine 20 executes a "Close Work" operator associated with the "Activity" node in the "Business Process" management object. Note here that the current activity is "Design Check" under the "Drawing Quality Control" activity. The "Close Work" operator is one of the model-specific methods associated with the "Activity" node in the business process model (see FIG. 9 and FIG. 10(A)). The execution of this "Close Work" operator causes the transmission of a "Send Completion" message to the "Output" node.

(S32) The processing engine 20 executes a "Send Completion" operator associated with the "Activity.Output" node (i.e., "Output" node under the "Activity" node) in the "Business Process" management object. The execution of this operator results in the transmission of an "Accept Completion" message to an "Input Name" node that has the same name as the output name "Design Check Result."

(S33) The processing engine 20 executes an "Accept Completion" operator associated with the "Input Name" node in the "Business Process" management object. This operator causes a "Send Work" message to a "Section" node with the name "Quality Assurance Section" in the "Organization" management object. Note that this node name derives from the "Resource Name" node under the current activity node.

(S34) The processing engine 20 executes a "Send Work" operator associated with the "Section" node in the "Organization" object. The execution of this operator results in the transmission of a "Check Start Condition" message to the next "Activity" node (i.e., "Design Rule Check") in the form of an E-mail massage addressed to Mr. Suzuki, Chief of Quality Assurance Section.

The above process of FIG. 20 is continued to another flowchart of FIG. 21, which shows a process to help Mr. Suzuki who has just logged in to the system.

(S41) The processing engine 20 executes a "Register Work Item" operator associated with a "Work Item" node in a "Work Item" management object, where the "Work Item" is a management object to be used when the management/control script is executed. As a result of the execution of this operator, the E-mail message generated in step S34 is received, an "Activity" node is created, and after that, a "Check Start Condition" message is transmitted to the "Activity" node in the "Business Process" management object.

(S42) The processing engine 20 executes a "Check Start Condition" operator associated with the "Activity" node in the "Business Process" management object. As a result of the execution of this operator, it is tested whether all necessary documents are ready for the execution of the requested activity. Then a "Prepare for Work" message is sent to an "Activity" node of the "Work Item" management object.

(S43) The processing engine 20 executes a "Prepare for Work" operator associated with the "Activity" node in the "Work Item" management object. As a result of the execution of this operator, the properties and status of the "Activity" node are updated, and a "Show Work Item List" message is transmitted to a "Work Item" node.

(S44) The processing engine 20 executes a "Show Work Item List" operator associated with the "Work Item" node in the "Work Item" management object. This operator causes the client process 61 to display a list of work items.

(S45) The user, Mr. Suzuki, selects a specific work item. The processing engine 20 then executes a "Show Work Details" operator associated with the "Activity" node in the "Business Process" management object. This operator causes the client process to display the details of the selected activity.

(S46) Mr. Suzuki now directs the system to send the work to his/her staff members. The processing engine 20 then executes an "Assign Work" operator associated with the "Activity" node in the "Business Process" management object. As a result of the execution of this operator, the system prompts Mr. Suzuki to select an appropriate staff member. When the selection is finished, a "Check Start Condition" message is sent to the "Activity" node via E-mail.

The above process of FIG. 21 is continued to still another flowchart of FIG. 22, which shows a process to be executed when the selected staff member in the Quality Assurance Section logs in to the system.

(S51) The processing engine 20 executes a "Register Work Item" operator associated with the "Work Item" node in the "Work Item" management object. As a result of the execution of this operator, the E-mail message produced in step S46 is received, and an "Activity" node is created. After that, a "Check Start Condition" message is transmitted to the "Activity" node in the "Business Process" management object.

(S52) The processing engine 20 executes a "Check Start Condition" operator associated with the "Activity" node in the "Business Process" management object. As a result of the execution of this operator, it is examined whether all necessary documents are ready for the execution of the current activity, i.e., "Design Rule Check." Such documents include: "Quality Standard," "Product Cost Standard," and "Design Check Result." If all these documents are ready, a "Prepare for Work" message is sent to the "Activity" node in the "Work Item" management object.

(S53) The processing engine 20 executes a "Prepare for Work" operator associated with the "Activity" node in the "Work Item" management object. As a result of the execution of this operator, the properties and status of the "Activity" node are updated, and a "Show Work Item List" message is transmitted to the "Work Item" node.

(S54) The processing engine 20 executes a "Show Work Item List" operator associated with the "Work Item" node in the "Work Item" management object. This operator causes the client process 61 to display a list of work items.

(S55) Here, the user selects a specific work item. The processing engine 20 then executes a "Show Work Details" operator associated with the "Activity" node in the "Business Process" management object. This operator causes the client process 61 to display the details of the selected activity.

The user now carries out a task of "Design Rule Check" by viewing the input documents (S56), referring to the control documents (S57), and creating the output documents (S58). Finally, the user notifies the system of the completion of the task, thereby concluding his/her assignment (S59). As indicated by the dotted arrows, these steps are initiated by the user, and the processing engine 20 responds to him/her by executing a relevant operator as follows.

(S56) The processing engine 20 executes a "Show Document Details" operator associated with an "Activity.Input.Input Name" node in the "Business Process" management object. As a result of the execution of this operator, the document "Design Check Result" is displayed.

(S57) The processing engine 20 executes a "Show Document Details" operator associated with an "Activity.Control.Control Name" node in the "Business Process" management object. As a result of the execution of this operator, the documents "Quality Standard" and "Product Cost Standard" are displayed.

(S58) The processing engine 20 executes a "Create Document" operator associated with an "Activity.Output.Output Name" node in the "Business Process" management object. This operator enables the user to create documents "Design Standard" and "Final Drawings" with an editor application.

(S59) The processing engine 20 executes a "Close Work" operator associated with the "Activity" node in the "Business Process" management object. This operator causes a "Send Completion" message to be sent to the output tag.

In the way described above, the message initiated by the "Close Work" operator of the "Design Check" activity triggers another activity and another message. The messages are propagated from node to node, tracing the tree structures of "Business Process" and "Organization" management objects, as illustrated in FIGS. 20 to 22.

Figure 23:
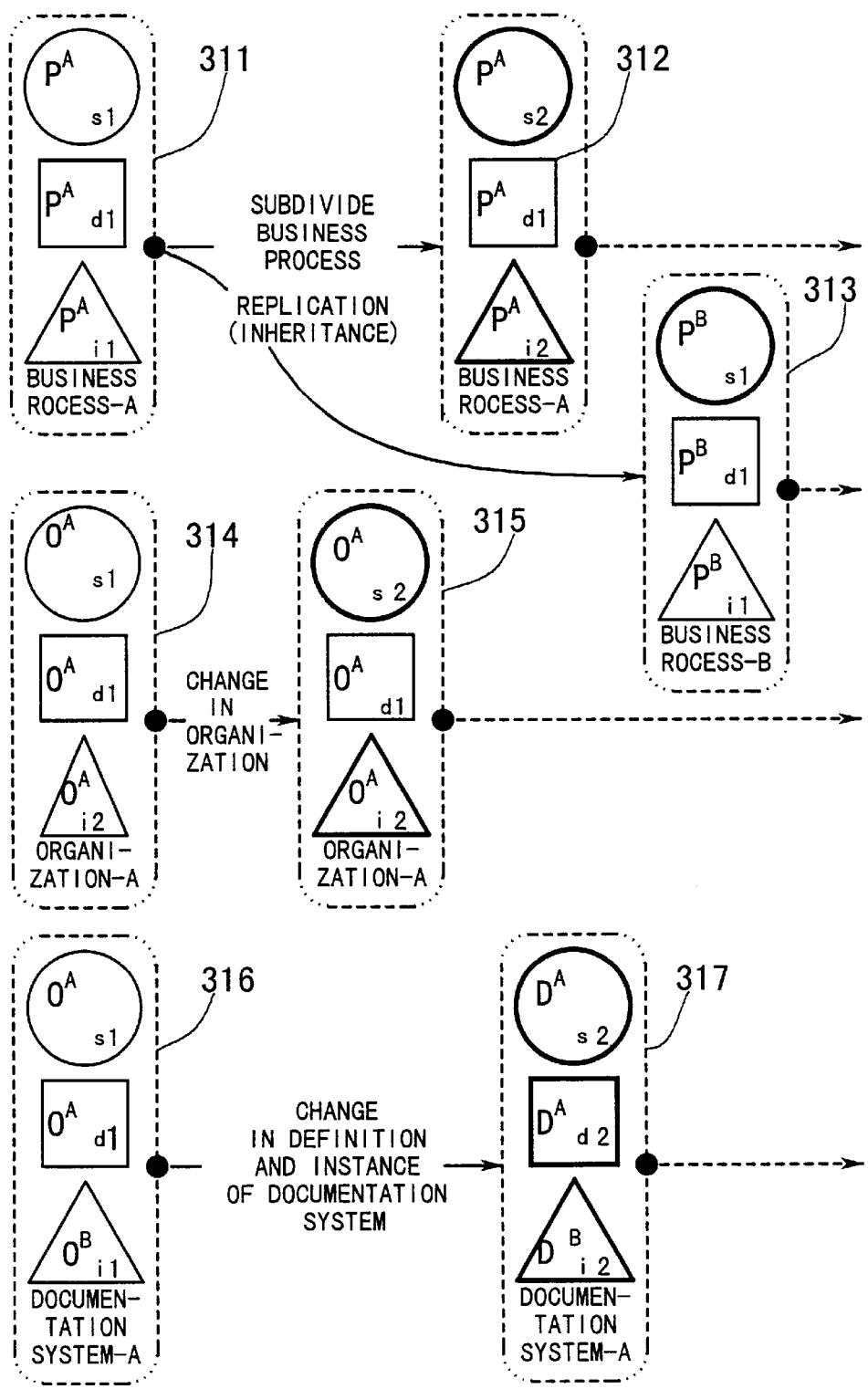
FIG. 23 is a diagram which schematically shows how structural changes occur.

Referring next to FIG. 23, the following section will describe how the system deals with structural changes of objects.

In real-life organizational activities, changes are virtually a daily occurrence. As a matter of fact, a company's organizational structure, business operations, documentation systems, design rules, and standard specifications are all subject to continual changes. FIG. 23 schematically shows such structural changes by illustrating a business process object, an organization object, and a documentation system object, which have initial structures as explained in FIGS. 9 to 16. With the passage of time, the organization is restructured, the business process model evolves to more detailed levels, the documentation system is redefined and altered, and one business process produces a new business process. In FIG. 23, the circles symbolize scripts, the squares show structure definitions, and the triangles represent instances. Additionally, capital letters "P," "O," and "D" denote data objects of the business process model, organization model, and documentation system model, respectively. The superscripts attached to these symbols are identifiers that distinguish derivative management objects from their original management object. The subscripts, on the other hand, indicate each data's version numbers.

Initially, the system comprises a "Business Process-A" management object 311, an "Organization-A" management object 314, and a "Documentation System-A" management object 316. In the course of real-life business operation, there arises a need for more detailed modeling to support some particular business operations. Accordingly, the scripts and instances of the management object 311 are changed, and a new management object 312 is created as a new version of "Business Process-A." On the other hand, to reuse the original management object 311 to support generic business activities, its replica is created as another management object 313 named "Business Process-B."

Similarly, the scripts and instances of the "Organization-A" management object 314 are modified in accordance with a change in the enterprise's organizational structure, resulting in a management object 315 having a new version number. Further, a renewal of the "Documentation System-A" management object 316 is conducted, thus producing a new management object 317 having updated scripts, structure definition, and instances.

The next section presents several examples of structural changes.

Figure 24:
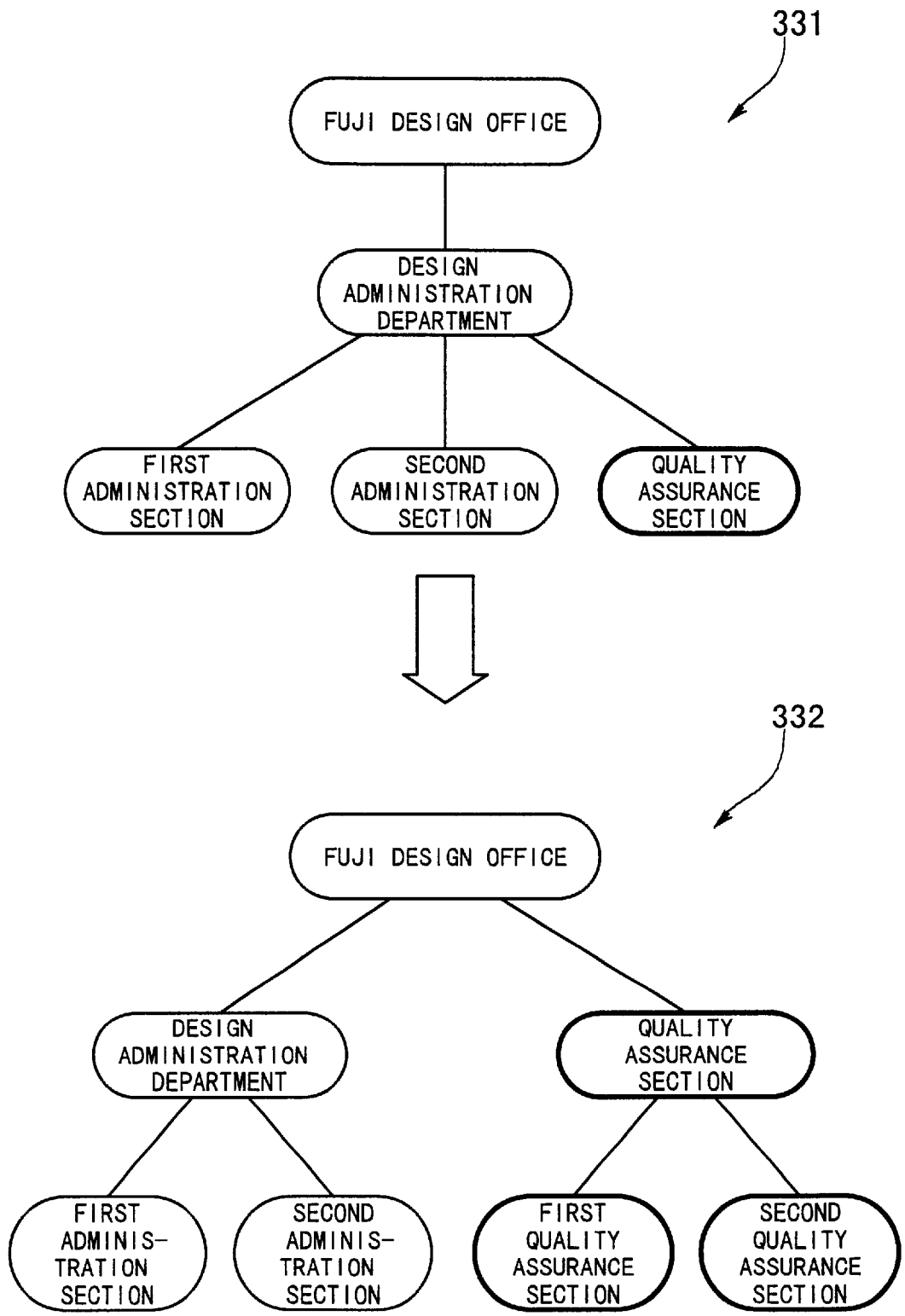
FIG. 24 is a diagram which illustrates a change in an organization.

FIG. 24 illustrates a change in an organizational structure, where an instance 331 is revised to another instance 332. In this example, a node named "Quality Assurance Section" in the original instance 331 has grown to "Quality Assurance Department" in the updated instance 332. This new department has two subordinate sections, "First Quality Assurance Section" and "second Quality Assurance Section," which are newly established nodes. When implementing such a change into the business support system, it is necessary to investigate the influence of the change by searching the present structure definition of business processes to find all activities which involves the old "Quality Assurance Section." Additionally, the existing methods that are specific to the old node of "Quality Assurance Section" should be changed so that the messages addressed to the old node will be automatically forwarded to the new nodes. By taking those measures, the system can deal with accidental references to the old node, or messages that have already been issued to the old node, thus being able to continue the service.

There is an alternative way of handling obsolete references to the old node "Quality Assurance Section" even after the change is implemented. More specifically, when a process script having a reference to the old node is encountered, the system will locate its child node, such as a node of Mr. Suzuki, ex-chief of the section. The system then makes a search for a relevant node in the new organization by using the name "Suzuki" as a keyword. This will allow the system to send a query to that node to ask how to handle the pending process.

Concerning the new nodes, they do not have to be fully furnished with a complete set of methods from the beginning. Rather, one can add new method definitions in an incremental manner, alleviating the expected impact of changes on the user environment. As described above, it is possible to clarify which part to modify and what steps to take toward expected changes. Actual tasks required are only to modify a part of the business process model and documentation system model related to the organization model. It is not difficult to develop a tool to support such tasks.

Figure 25:
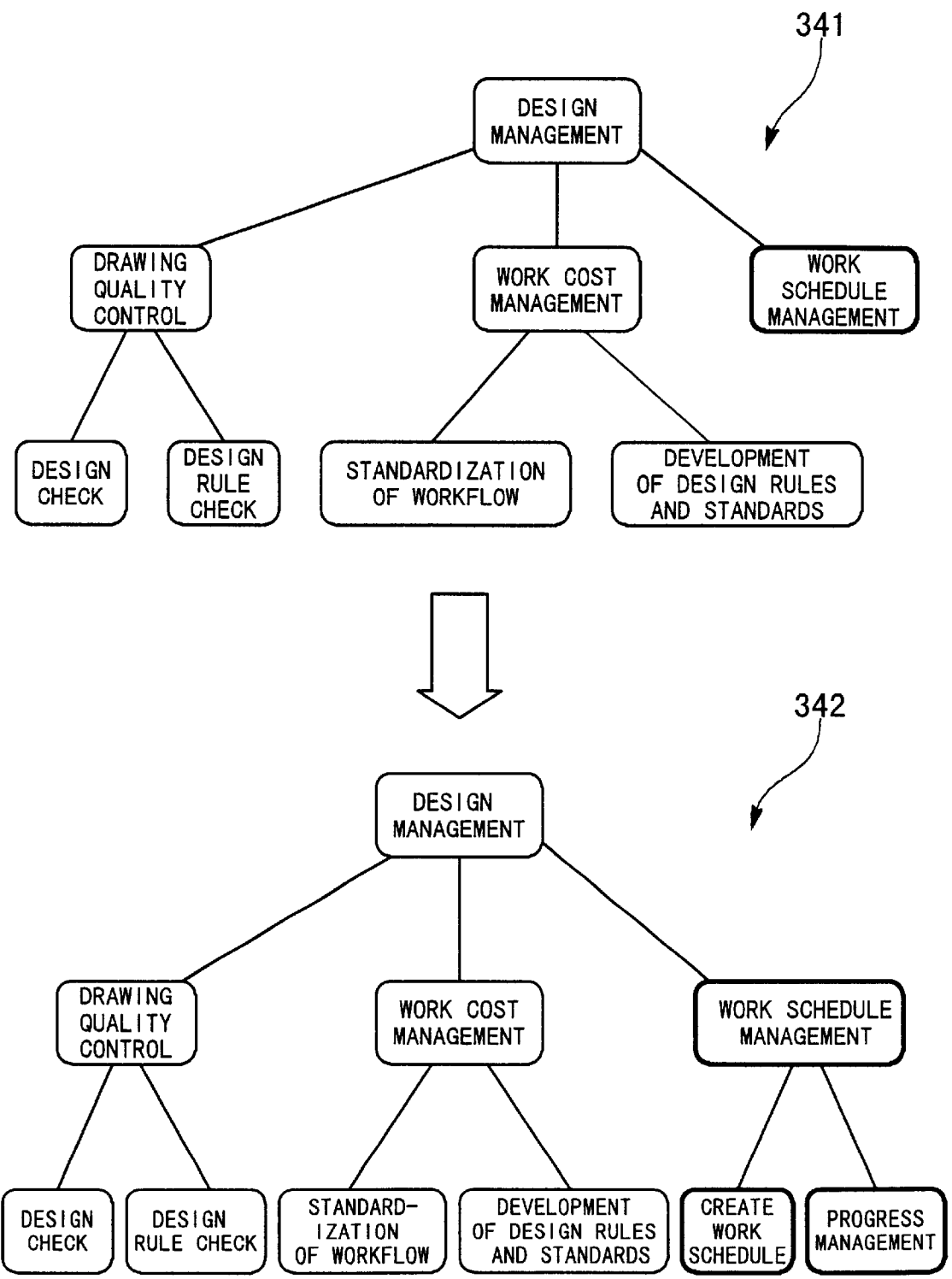
FIG. 25 is a diagram which illustrates a change in a business process.

To incorporate detailed operations into the business process model, the SGML instance of FIG. 11 has to be changed. FIG. 25 shows an example of such a process change. In this specific example, a business process instance 341 initially includes an activity named "Work Schedule Management," whose behavior is broadly defined at this stage. In a modified instance 342, the "Work Schedule Management" activity is divided into two child activities named "Daily Schedule Planning" and "Progress Management." To update the model, the system would require no other things than modifying the instance, if the default methods provide sufficient functions. It is of course possible to define methods specific to the new instance. While some messages may still have a logical destination address to reach the old node, the system can handle them properly, if the new node "Work Schedule Management" has a new process script that transfers messages to its child nodes.

In the above case, the new business process model preserves old node names, and thus the messages addressed to the old node can reach a new node having the same node name. However, there may be such a situation where a node is renamed in the new business process model, meaning that a message addressed to such a node would be lost. In this case, the system would examine the old business process model to find a relevant department or section. The message would be transferred to this alternative destination, if available. It is also possible to configure the system to return the message to its sender, if there is no clue to identify the destination.

As described above, the business process model can be developed in a stepwise fashion, from a broad layout to detailed definitions. Since the model can be reconfigured easily and its output immediately reflects the alterations being made, the enterprise can keep competitive in today's ever-changing business environment.

Figure 26:
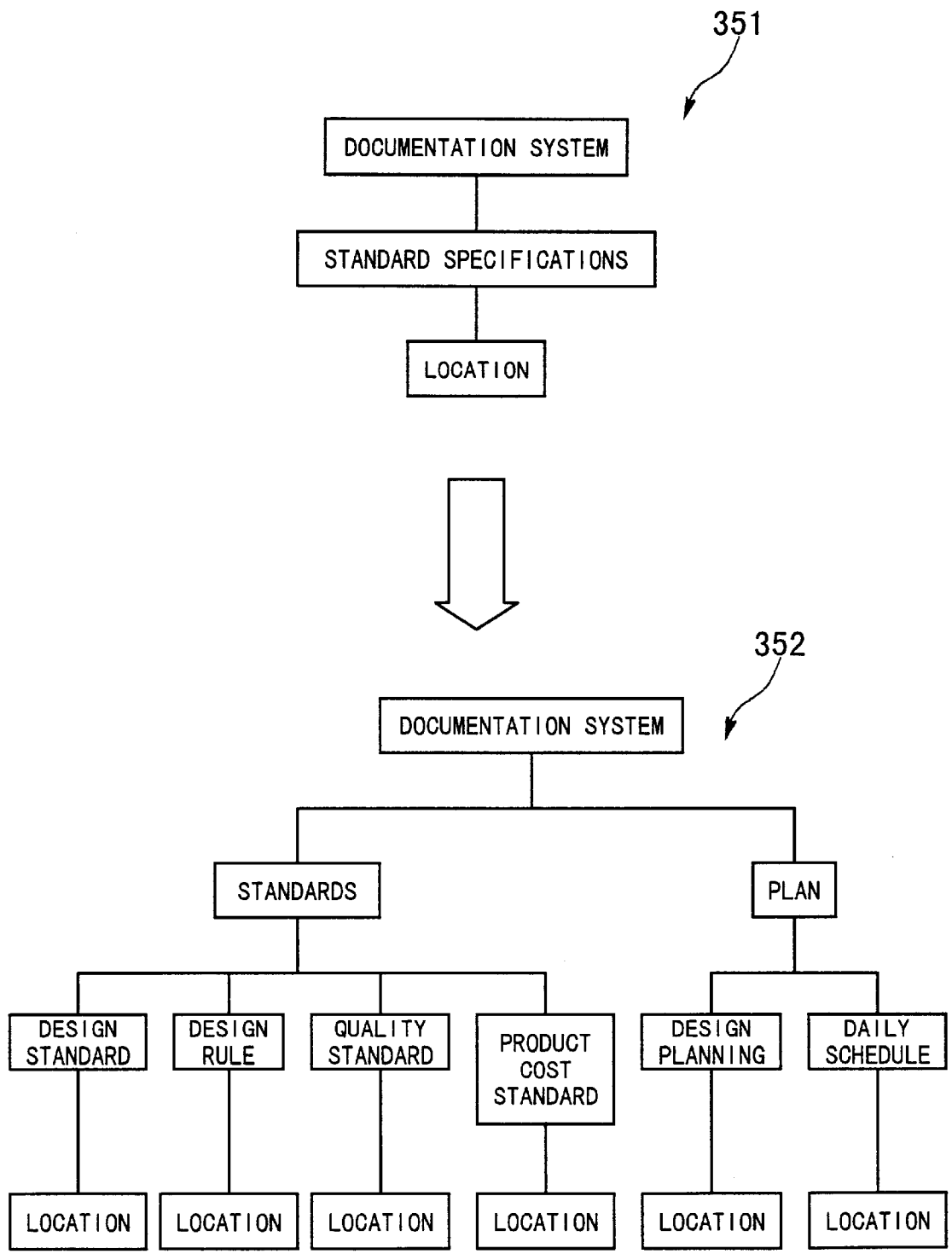
FIG. 26 is a diagram which illustrates a change in a structure definition of the documentation system.

The next example is a change in the documentation system definition. Since a change in the DTD will affect its instance, or the documentation system, the definition of the SGML instance of FIG. 16 should be changed, in addition to the DTD of FIG. 15. FIG. 26 shows an example of such a change in the documentation system definition. Originally, this documentation system contains only one element named "Standard Specifications" as shown in a structure definition 351. This primitive definition is changed to a new structure definition 352, in which the documents are classified into two new groups "Standards" and "Planning." In addition, several lower-level nodes, such as "Design Standards" and "Design Planning," are added to the structure to define appropriated default methods depending on the document types.

Figure 27:
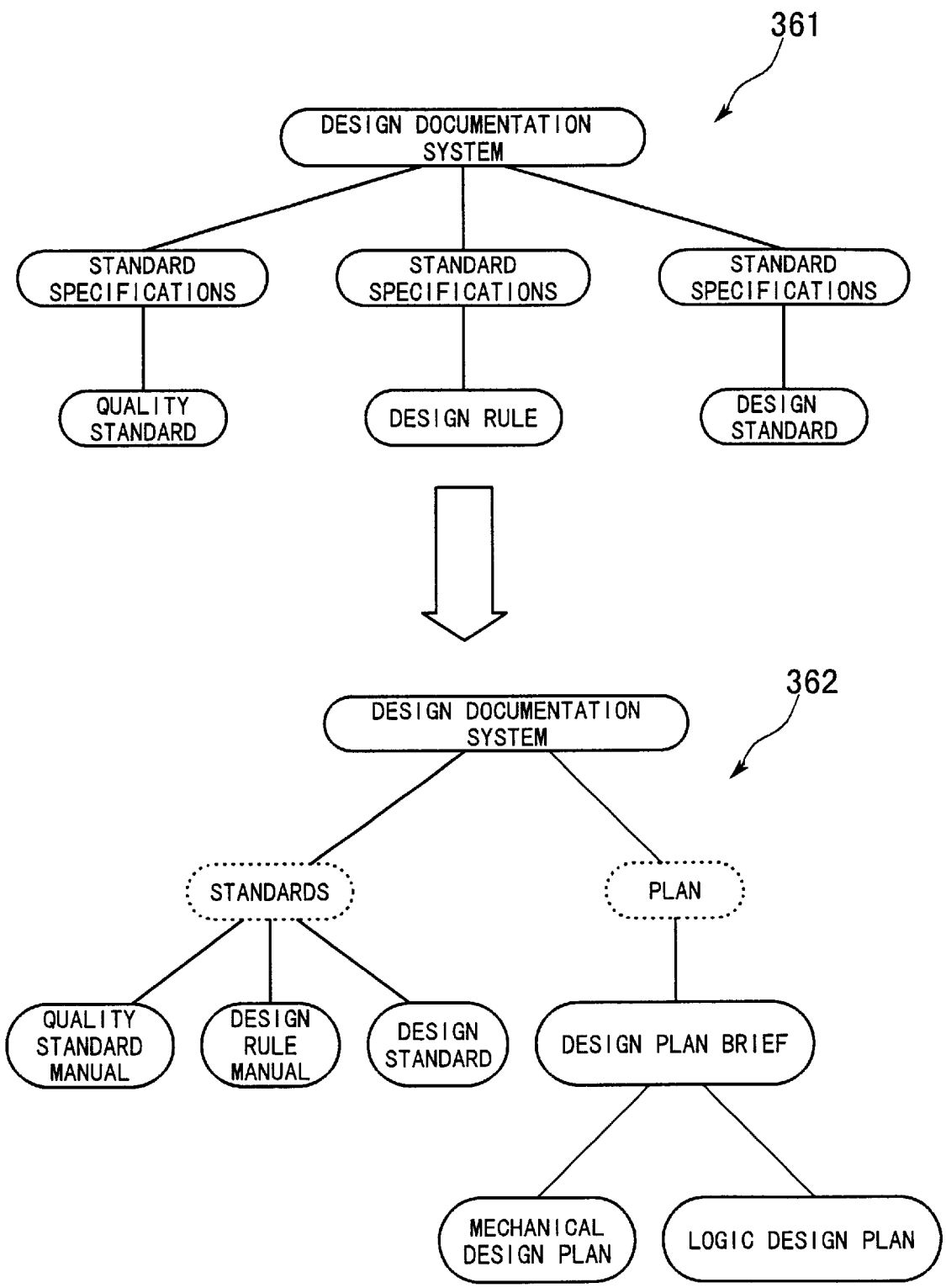
FIG. 27 is a diagram which illustrates a change in an instance of the documentation system.

FIG. 27 illustrates a change in the documentation system instance which is caused by a renewal of the documentation system model shown in FIG. 26. In this example, an original instance 361 has changed to a new instance 362 having a different tree structure. The new structure has a node named "Design Plan Brief" and its two child nodes "Mechanical Design Plan" and "Logic Design Plan." Although model-specific methods should be developed to provide better services to the user, it is still possible to apply the existing methods in most cases since the main concept of the documentation system is fully preserved. In spite of the structural changes described above, the processing engine 20 serves well for both the old and new versions of a documentation system since they are described in the same style.

In real-life activities, one business process sometimes produces its derivative processes. For example, a company divides itself into a plurality of companies to make their organization more competitive; a new project starts in a company; part of an existing process forms an independent process. It is not difficult, however, to define new business processes suitable for these cases. Typically, this can be accomplished by replicating a similar business process model and modifying the replica so that it will serve for the purpose.

Figure 28:
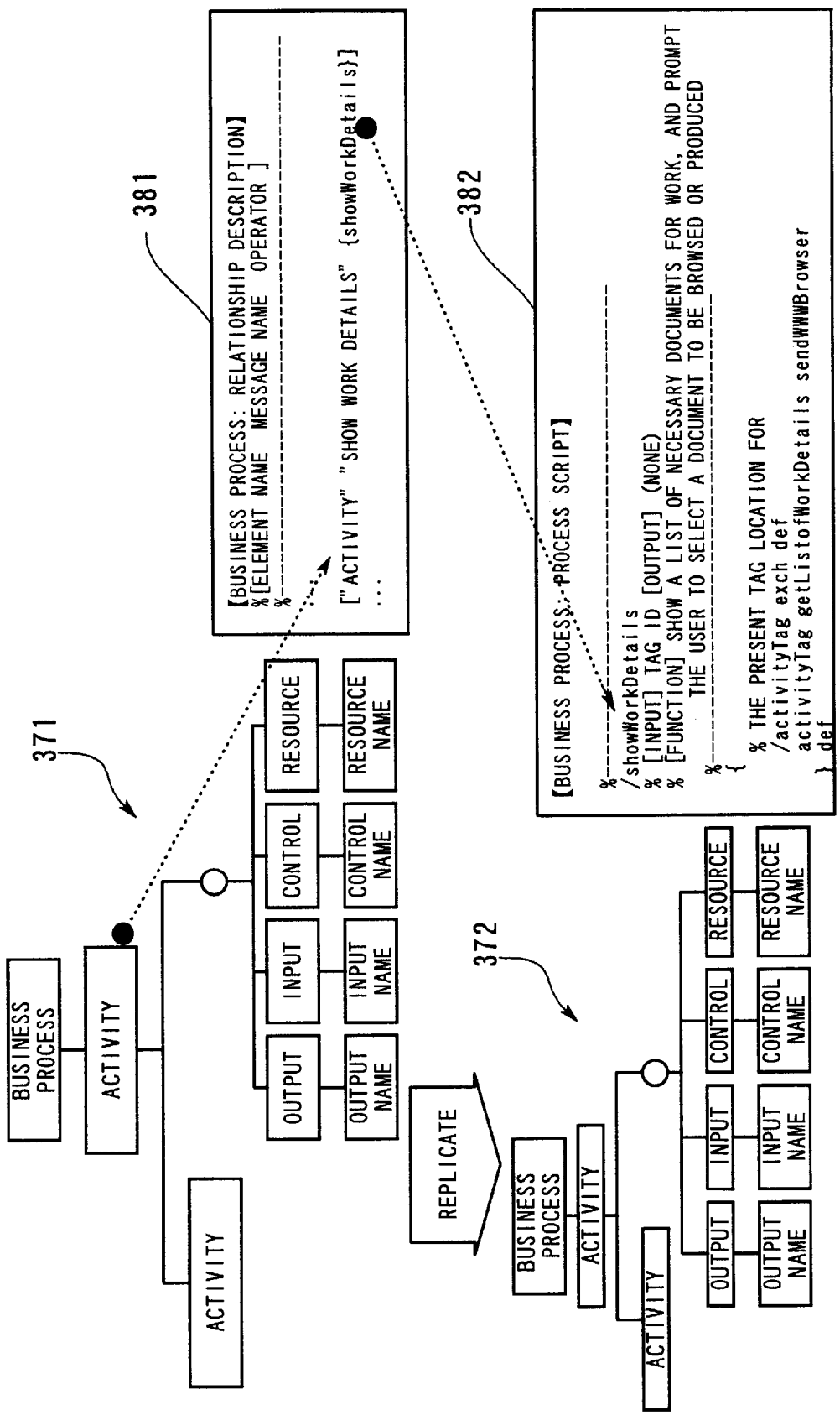
FIG. 28 is a first diagram which shows how the business process model is reused.

FIG. 28 is a first diagram which shows how to reuse a business process model, assuming that a business process instance is changed as shown in FIG. 25. In FIG. 28, a relationship description 381 connects a structure definition 371 with a process script 382, by which a model-specific method named "Show Work Details" is defined in association with an "Activity" node in the business process model. A new structure definition 372 is now produced by replicating this structure definition 371.

Figure 29:
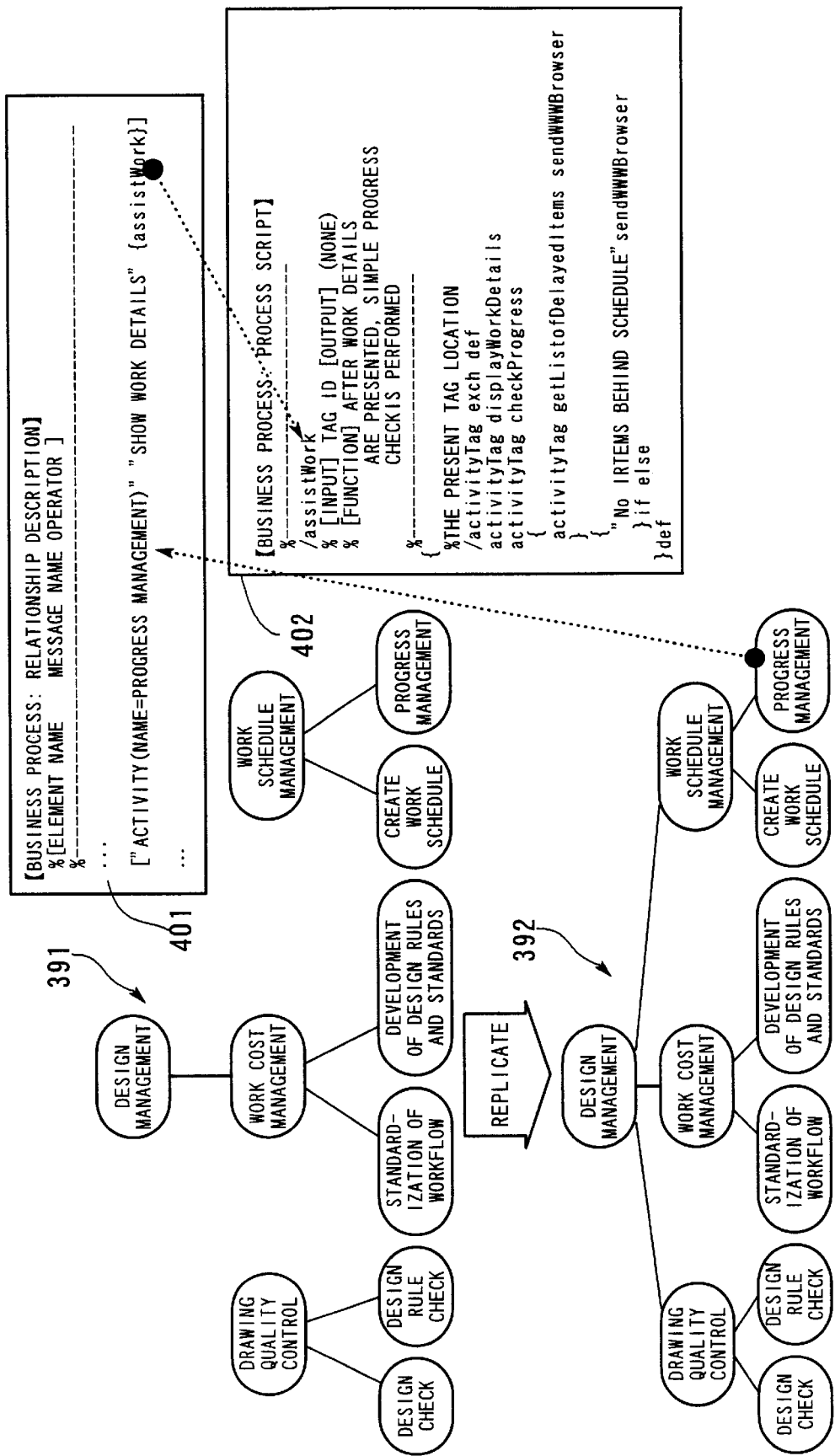
FIG. 29 is a second diagram which shows how the business process model is reused.

FIG. 29 is a second diagram which shows how to reuse a business process model. Here, a new instance 392, a replica of an existing instance 391, is also produced in conjunction with the replicated structure definition 372. This instance 392 contains an activity named "Progress Management" which is associated with an instance-specific method named "Support Work" as described in a relationship description 401. The definition of this method is added to a process script 402 as a "Support Work" operator. This operator uses the "Show Work Details" operator, which is a model-specific method associated with an activity that has been inherited from the original business process model. The process script 402 defines that the "Support Work" operator finds all activities that are behind the schedule and then displays a list of such delayed activities with the "Show Work Details" operator. As the relationship description 401 shows, this "Support Work" operator is activated when a "Show Work Details" message arrives at the "Progress Management" activity.

The above example has shown that the system can provide such a service that is specific to a particular activity, without affecting other activities. Additionally, the new business process model can inherit almost all assets of process definitions from the old model, if the two models bear a close resemblance in their structures. Furthermore, the original and new business process models can be handled by the same processing engine without any interference between the two models, because they are defined as separate management objects.

The proposed processing mechanisms are actually implemented as hardware and software functions of a computer system. The process steps of the proposed data business support system are encoded in a computer program, which will be stored in a computer-readable storage medium. The computer system executes such programs to provide the intended functions of the present invention. The suitable computer-readable storage media include magnetic storage media and solid state memory devices. Some portable storage media, such as CD-ROMs (Compact Disk Read Only Memory) and floppy disks, are also suitable for circulation purposes. Further, it will be possible to distribute the programs through an appropriate server computer deployed on a network. The program file delivered to the user is normally installed in his/her computer's hard drive or other local mass storage devices, and executed after being loaded on the main memory.

The above discussion will now be summarized as follows. In the structured data management system of the present invention, appropriate process scripts are associated with nodes of a tree structure that represents a structured data object. The system provides services related to the structured data object by executing the process scripts of relevant nodes. It is easy for the system to deal with possible changes in the structured data object, since it is designed to trace the tree structure to determine which nodes to execute.

The structured data management program of the present invention is stored in a computer-readable medium. With this program executed on a computer, flexible operations to handle structured data objects, including their changes, will be realized.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable storage medium for storing a structured data management program that provides services concerning a structured electronic data object, the structured data management program being designed to run on a computer to cause the computer to function as:

a structured data storage unit storing the structured data objects, each of which is expressed as a tree structure having a plurality of nodes representing units of data to be processed, each of the nodes being associated with a process script that defines what process should be executed; and a structured data processing unit identifying a destination node in a particular one of the structured data objects stored in said structured data storage unit by tracing the tree structure of the particular structured data object according to a process request addressed to the destination node, executing the process script associated with the destination node according to the process request, and sending another process request to another node if required in the execution of the process script, wherein:

the particular structured data object is changed from a first version to a second version;

as a result of the change, one of the nodes defined in the first version of the particular structured data object becomes obsolete in the second version, said structured data storage unit stores both the first and second versions of the particular structured data object in an associated manner, and said structured data processing unit identifies an alternative destination node in the second version of the particular structured data object, upon receipt of a process request addressed to the obsolete node, by analyzing the tree structures of the first and second versions of the particular structured data object.

2. A structured data management system for providing services concerning structured electronic data objects, comprising:

a structured data storage unit storing the structured data objects, each of which is expressed as a tree structure having a plurality of nodes representing units of data to be processed, each of the nodes being associated with a process script that defines what process should be executed; and a structured data processing unit identifying a destination node in a particular one of the structured data objects stored in said structured data storage unit by tracing the tree structure of the particular structured data object according to a process request addressed to the destination node, executing the process script associated with the destination node according to the process request, and sending another process request to another node if required in the execution of the process script wherein:

the particular structured data object is changed from a first version to a second version, as a result of the change, one of the nodes defined in the first version of the particular structured data object becomes obsolete in the second version, said structured data storage unit stores both the first and second versions of the particular structured data object in an associated manner, and said structured data processing unit identifies an alternative destination node in the second version of the particular structured data object, upon receipt of a process request addressed to the obsolete node, by analyzing the tree structures of the first and second versions of the particular structured data object.

3. The structured data management system according to claim 2, wherein said structured data processing unit sends another process request to another node in another structured data object, if required in the execution of the process script.

4. The structured data management system according to claim 2, wherein said structured data processing unit provides business support functions by processing a structured data object that contains definitions of business processes.

5. The structured data management system according to claim 2, wherein said structured data processing unit automatically delivers the structured data objects and the process scripts.

6. The structured data management system according to claim 2, wherein said structured data processing unit performs security protection of the process scripts by using cryptography techniques.

7. The structured data management system according to claim 2, wherein said structured data processing unit simulates processes concerning the structured data objects by imitating external environments with a computer, when executing the process script.

8. The structured data management system according to claim 2, wherein said structured data processing unit performs security protection for each element of the structured data objects by using cryptography techniques.

* * * * *

UNITED STATES PATENT AND TRADEMARK OFFICE
CERTIFICATE OF CORRECTION

PATENT NO. : 6,314,434 B1
DATED : November 6, 2001
INVENTOR(S) : Nobuhisa Shigemi et al.

Page 1 of 1

It is certified that error appears in the above-identified patent and that said Letters Patent is hereby corrected as shown below:

<u>Title page,</u>
Item [54], change "STRUCTURED DATA MANAGEMENT SYSTEM AND COMPUTER-READABLE METHOD FOR STORING STRUCTURED DATA MANAGEMENT PROGRAM"
to -- STRUCTURED DATA MANAGEMENT SYSTEM AND COMPUTER-READABLE MEDIUM FOR STORING STRUCTURED DATA MANAGEMENT PROGRAM --.

Signed and Sealed this

Twenty-sixth Day of March, 2002

Attest:

*Attesting Officer*

JAMES E. ROGAN
*Director of the United States Patent and Trademark Office*